(12) United States Patent
Vacca et al.

(10) Patent No.: US 6,949,176 B2
(45) Date of Patent: Sep. 27, 2005

(54) MICROFLUIDIC CONTROL USING DIELECTRIC PUMPING

(75) Inventors: Giacomo Vacca, Menlo Park, CA (US); John T. Kenney, Palo Alto, CA (US); Dudley A. Saville, Princeton, NJ (US)

(73) Assignee: Lightwave Microsystems Corporation, San Jose, CA (US)

(*) Notice: Subject to any disclaimer, the term of this patent is extended or adjusted under 35 U.S.C. 154(b) by 311 days.

(21) Appl. No.: 10/087,264

(22) Filed: Feb. 28, 2002

(65) Prior Publication Data

US 2003/0006140 A1 Jan. 9, 2003

Related U.S. Application Data

(63) Continuation-in-part of application No. 10/085,885, filed on Feb. 27, 2002.
(60) Provisional application No. 60/360,472, filed on Feb. 27, 2002, and provisional application No. 60/272,337, filed on Feb. 28, 2001.

(51) Int. Cl.[7] .......................... G01N 27/26; G02B 6/26; G02B 6/42
(52) U.S. Cl. ...................... 204/547; 204/643; 204/451; 204/601; 385/18
(58) Field of Search .................... 204/547, 450, 204/451, 600, 601, 643

(56) References Cited

U.S. PATENT DOCUMENTS

| | | | |
|---|---|---|---|
| 4,390,403 A | * | 6/1983 | Batchelder .................. 204/547 |
| 4,505,539 A | | 3/1985 | Auracher et al. |
| 4,583,824 A | | 4/1986 | Lea |
| 4,789,228 A | | 12/1988 | Le Pesant et al. |
| 4,818,052 A | | 4/1989 | Le Pesant et al. |
| 4,988,157 A | | 1/1991 | Jackel et al. |
| 5,181,016 A | | 1/1993 | Lee |

(Continued)

FOREIGN PATENT DOCUMENTS

| | | | | |
|---|---|---|---|---|
| DE | 197 11 564 | 10/1998 | | |
| EP | 0 815 940 | 1/1998 | | |
| EP | 0 884 714 | 12/1998 | | |
| FR | 2 794 039 | 12/2000 | | |
| GB | 2207522 A | * | 7/1987 | ................. 359/228 |
| GB | 2 204 710 | 11/1988 | | |
| GB | 2 254 161 | 9/1992 | | |
| JP | 06-175052 | 6/1994 | | |
| JP | 07-092405 | 4/1995 | | |
| JP | 08-062645 | 3/1996 | | |
| WO | WO 01/98759 | 12/2001 | | |

OTHER PUBLICATIONS

Togo, H. et al. (1999). "Multi–Element Thermo–Capillary Optical Switch and Sub–Nanoliter Oil Injection for its Fabrication," *Miro Electro Mechanical Systems, 12th IEE International Conference*, Jan. 17–21, 1999 pp. 418–423.

Patent Abstracts of Japan for Japanese patent No. 06–175052, published on Jun. 24, 1994 (2 pages, abstract only).

Patent Abstracts of Japan for Japanese patent No. 07–092405, published on Apr. 7, 1995 (1 page, abstract only).

(Continued)

*Primary Examiner*—Nam Nguyen
*Assistant Examiner*—Jeffrey Barton
(74) *Attorney, Agent, or Firm*—Morrison & Foerster LLP

(57) ABSTRACT

Devices and methods utilizing dielectric pumping and variable dielectric pumping to move fluids through microchannels. Two fluids having dissimilar dielectric constants form an interface that is positioned between two electrodes in order to move the interface and therefore the fluids. Dielectric pumping and variable dielectric pumping may be used to move fluids in miniaturized analytical packages containing microchannels in which forces created by surface tension predominate over the gravitational force.

24 Claims, 11 Drawing Sheets

U.S. PATENT DOCUMENTS

| | | | |
|---|---|---|---|
| 5,699,462 A | | 12/1997 | Fouquet et al. |
| 5,795,457 A | * | 8/1998 | Pethig et al. ............... 204/547 |
| 5,921,678 A | | 7/1999 | Desai et al. |
| 5,956,005 A | | 9/1999 | Sheridon |
| 5,960,131 A | | 9/1999 | Fouquet et al. |
| 5,978,527 A | | 11/1999 | Donald |
| 6,055,344 A | | 4/2000 | Fouquet et al. |
| 6,072,924 A | | 6/2000 | Sato et al. |
| 6,170,981 B1 | | 1/2001 | Regnier et al. |
| 6,195,478 B1 | | 2/2001 | Fouquet |
| 6,210,128 B1 | | 4/2001 | Rife et al. |
| 6,231,737 B1 | | 5/2001 | Ramsey et al. |
| 6,284,113 B1 | * | 9/2001 | Bjornson et al. ........... 204/453 |
| 6,287,520 B1 | | 9/2001 | Parce et al. |
| 6,306,659 B1 | | 10/2001 | Parce et al. |
| 6,331,073 B1 | | 12/2001 | Chung |
| 6,331,439 B1 | | 12/2001 | Cherukuri et al. |
| 6,334,676 B1 | | 1/2002 | Kaszczuk et al. |
| 6,337,740 B1 | | 1/2002 | Parce |
| 6,342,142 B1 | | 1/2002 | Ramsey |

OTHER PUBLICATIONS

Patent Abstracts of Japan for Japanese patent No. 08–062645, published on Mar. 8, 1996 (1 page, abstract only).

Beni, G. and Hackwood, S. (1981). "Electro–Wetting Displays," *Appl. Phys. Lett.* 38(4):207–209.

Jackel, J. L. et al. (1983). "Electro Wetting Switch for Multimode Optical Fibers," *Applied Optics* 22(11): 1765–1770.

Jang, J. and Lee, S. S. (2000). "Theoretical and Experimental Study of MHD (Magnetohydrodynamic Micropump," *Sensors and Actuators* 80:84–89.

Krijnen, G. J. M. et al. (1999). "Optical Devices Based on Fluidic Controlled Two–Mode Interference," *J. Micromech. Microeng.* 9:203–205.

Lea, M. C. (1981). "Optical Modulators Based on Electrocapillarity," *Optic Letters* 6(8):395397.

Lee, J. and Kim, C–J (2000). "Surface–Tension–Driven Microactuation Based on Continuous Electrowetting," *Journal of Microelectromechanical Systems* 9(2):171–180.

Lemoff, A. V. and Lee, A. P. (2000). "An AC Magnetohydrodynamic Micropump," *Sensors and Actuators* B63:178–185.

Makihara, M. et al. (1999). "Micromechanical Optical Switches Based on Thermocapillary Integrated in Waveguide Substrate," *Journal of Lightwave Technology* 17(1):14–18.

Pollack, M. G. and Fair, R. B. (2000). "Electrowetting––Based Actuation of Liquid Dropets for Microfluidic Applications," *Applied Physics Letters* 77(11):1725–1726.

Prins, M. W. J. et al. (2001). "Fluid Control in Multichannel Structures by Electrocapillary Pressure," *Science* 291:277–280.

Richter, A. et al. (1991). "Electrohydrodynamic Pumping and Flow Measurement," *IEEE Proc. MEMS*, New York, USA, pp. 271–276.

Richter, A. and Hermann, S. (1990). "An Electrohydrodynamic Micropump," *IEEE Proc. MEMS*, New York, USA, pp. 99–104.

Ross, D. and Atchison, J. S. (2001). "Microfluidic Optical Switches Using Two Non–Mixing Fluids in a Mach Zehnder Interferometer," OECC/IOOC 2001 Conferences Incorporating ACOFT, Monday Jul. 2–Thursday Jul. 5, 2001, 2 pages.

Sakata, T. et al. (2001). "Improvement of Switching Time in a Thermocapillarity Optical Switch," *Journal of Lightwave Technology* 19(7):1023–1027.

Sato, M. (1994). "Electrocapillarity Optical Switch," *IEICE Trans. Commun.* E77–B(2):197–203.

Vallet, M. et al. (1996). "Electrowetting of Water and Aqueous Solutions on Poly(Ethylene Terephthalate) Insulating Films," *Polymer* 37(12):2465–2470.

* cited by examiner ic Control Using Dielectric Pumping", inventors Giacomo Vacca, John T. Kenney, and Dudley A. Saville. The disclosure of PCT/US02/06325 is also incorporated by reference for all purposes, as if fully put forth below.

MICROFLUIDIC CONTROL USING DIELECTRIC PUMPING

RELATED APPLICATIONS

This application is a Continuation-In-Part application of non-provisional U.S. Ser. No. 10/085,885, entitled "Microfludic Control For Waveguide Optical Switches, Variable Attenuators, And Other Optical Devices", inventors Anthony J. Ticknor, John T. Kenney, Giacomo Vacca, Dudley A. Saville, and Ken G. Purchase, filed Feb. 27, 2002, and this application claims the benefit of priority to provisional U.S. application Ser. No. 60/360,472, entitled "Microfludic Control For Waveguide Optical Switches, Variable Attenuators, And Other Optical Devices", inventors Anthony J. Ticknor, John T. Kenney, Giacomo Vacca, Dudley A. Saville, and Ken G. Purchase, filed Feb. 27, 2002, and to provisional U.S. application Ser. No. 60/272,337, filed Feb. 28, 2001. The disclosure of each of these applications is incorporated by reference for all purposes, as if fully put forth below. This application also claims benefit of foreign priority to application PCT/US02/06325, entitled "Microfludic Control Using Dielectric Pumping", inventors Giacomo Vacca, John T. Kenney, and Dudley A. Saville. The disclosure of PCT/US02/06325 is also incorporated by reference for all purposes, as if fully put forth below.

TECHNICAL FIELD

This invention relates to the field of fluid movement and microfluidics by providing a new way to move fluids within channels, particularly small volumes of fluids through microchannels.

BACKGROUND OF THE INVENTION

Microfluidic devices have been and continue to be developed for use in a number of fields. For instance, microfluidic devices are being developed for use in medical diagnostics, in which a volume of sample from a patient (such as a droplet of blood) is processed within a microfluidic device. The sample and/or other small volumes of fluids containing analytes are moved from reservoirs or other receiving chambers through microchannels to one or more reaction or association chambers to determine whether the sample contains one or more target molecules of interest (such as DNA from a pathogen). Such devices also can be configured for use in sampling air to determine the presence of pathogens or poisons by drawing in a sample of air and processing this fluid sample to identify whether DNA or another signature of interest (such as proteins uniquely associated with the pathogen) is present.

Other microfluidic devices and fields include: sorters or purifiers, in which individual cells or molecules of interest are separated from other cells or molecules by size, type, or other criteria; electrophoretic sorters, wherein different materials are separated from one another using electrophoretic force [e.g., see J. W. Parce, U.S. Pat. No. 6,337,740 (2002)]; oligonucleotide arrays, where fluids containing labeled target oligonucleotides are moved to a surface of a substrate to which complementary probe oligonucleotides are attached; protein or cell arrays, where fluids containing labeled proteins or cells are moved to a surface of a substrate to which probe proteins or cells are attached and with which the targets of interest associate; a chromatograph, in which liquid chromatography is performed [e.g., see J. M. Ramsey, U.S. Pat. No. 6,342,142 (2002)]; microfluidic printing, in which inks are formed by moving precursors through microchannels [e.g., see L. A. Kaszczuk et al., U.S. Pat. No. 6,334,676 (2002)]; microfluidic mixers, in which one or more fluids are moved through a mixer inserted in a microchannel; high throughput screening devices, in which libraries of compounds are delivered to a microfluidic device which uses the compounds to determine their effects on various chemical or biological systems [e.g., see J. W. Parce et al., U.S. Pat. No. 6,306,659]; and optical systems, in which a bubble or slug of fluid immiscible in a second fluid is moved through the second fluid to a spot of optical activity on the substrate.

Each of these systems has a common requirement: moving small amounts of one or more fluids through very small channels, where surface tension of the fluid being moved is a predominant force in determining how well the fluid moves. Microfluidic systems typically analyze or process very small samples, so little sample needs to be obtained and prepared for use in a microfluidic system. However, the miniaturization of channels introduces problems of fluid movement where capillary forces predominate.

Systems have been configured in various ways to move fluids through small channels where capillary forces dominate over gravity. One configuration for moving a fluid in microchannels involves establishing a pressure differential between a point where the fluid is and a point where the fluid is to be moved. A reservoir of the fluid may be pressurized to force liquid through a microchannel to its destination, and/or a vacuum or low-pressure region may be established in the destination to draw the fluid to its destination. In microfluidic channels such as capillaries, however, large pressure differentials are needed to overcome the large flow resistance encountered in channels of such small cross-sectional area.

Other configurations have been devised to move fluids through microchannels. Such fluid pumps have been configured to utilize electrical, electrokinetic, thermal, or other driving forces to move fluids through microchannels. For example, a fluid pump may be configured to utilize an electrical driving force by configuring the electrodes and selecting the fluids so that the fluids move by electrocapillarity, electrowetting, or continuous electrowetting. A fluid pump may instead be configured to utilize an electrokinetic force such as electrophoresis, electroosmosis. A fluid pump may also be configured to utilize driving forces such as dielectrophoresis, electro-hydrodynamic pumping, or magneto-hydrodynamic pumping, by configuring the electrodes and selecting and placing the fluids within the microchannel in an appropriate manner.

Fluid pumps configured to move fluid using electrical, electrokinetic, or thermal driving forces cannot be implemented in many instances. Fluid movement depends in large part upon fluid properties, and the properties of certain fluid systems are not well-suited to use electrical, electrokinetic, or thermal forces to move the fluid.

Thus, it would be of great advantage to the field of microfluidics to provide a new means to move fluids within microchannels as are found in microfluidic devices.

SUMMARY OF THE INVENTION

The invention provides new devices and methods in which fluids are moved through microchannels using capacitance as the driving force. The invention further provides some particular systems in which a capacitive force is used to move fluids through microchannels.

The invention consequently provides a method in which two fluids having dissimilar dielectric constants are moved through a microchannel by applying an electric field to an interface between the two fluids. The invention also provides a device having walls that define a microchannel containing two fluids of dissimilar dielectric constant in contact with one another at a fluid interface, and electrodes in the vicinity of the fluid interface that form a capacitor that can generate an electric field that moves the fluid interface and thus the fluids.

The devices and methods of the invention may thus be applied to a wide variety of disparate fields in which it is desirable to move fluids within microchannels. These include the established field of biological research, in which small amounts of fluids containing DNA fragments extracted from subjects contact polynucleotide microarrays in order to map the human genome and identify homologous genes. The fields also include the field of medical research, in which small amounts of DNA extracted from patients contact polynucleotide microarrays to identify polymorphisms that are associated with disease. The fields also include the emerging fields of proteomics and high-throughput screening of, e.g., drugs or chemicals to determine the interaction of these compounds with proteins and other compounds of interest (such as antibodies or chemicals involved in metabolic pathways). The fields also include the field of optical telecommunications and optical data transmission, in which optical signals are used to convey information at the speed of light.

The devices and methods of the invention may thus move two fluids, at least one of which is a fluid of interest (such as a fluid that contains sample to be analyzed or a fluid having particular optical properties). The devices and methods of the invention may also be used to move a third fluid of interest. In this aspect of the invention, the fluids in the vicinity of an electric field generated by a capacitor are selected for their ability to move in the presence of the electric field. The third fluid of interest is in communication with the other fluids such that the third fluid moves when the interface between the first and second fluids moves. This allows the third fluid to be selected for other desirable properties. For instance, the third fluid may be a fluid containing a biological molecule, such as a liquid that contains cells, enzymes, polynucleotides such as ribonucleic acid, deoxyribonucleic acid, peptide nucleic acids, and gene fragments; proteins; and other molecules found or used in research of biological systems. This third fluid may be moved within the device to mix, react, or interact with other compounds. The third fluid may instead be a drug that has efficacious use in mammals and especially humans. The drug may be moved within the device to contact, e.g., biological compounds to determine the drug's interactions with these compounds, or the drug may be dispensed from the device as, e.g., an aerosol. The third fluid may also optionally be moved to a spot on the device where it interacts with the signal from an optical waveguide, causing a detectable change in optical properties of the signal such as intensity, phase, and spectral content; this enables the performance of chemical or biological assays using, e.g., spectroscopy based on optical interactions such as absorption, fluorescence, second-harmonic generation, surface-enhanced second-harmonic generation, and/or surface plasmon resonance. The third fluid may instead be a fluid having optical properties suitable to effect a change in an optical signal, and thus a wide range of optical devices as used in optical telecommunications or in optical data transmission may be provided. Furthermore, there may be subordinate elements such as refractive, diffractive, reflective, or absorptive elements or beads having, e.g., proteins or polynucleotides attached that are solid and are dragged along by the surface tension and interfaces of the fluids, or by viscous drag of the fluid flow itself.

In many instances, the volumes of fluids incorporated into a single device measure in the picoliter to milliliter range, with typical volumes measured in nanoliters. Devices of the invention typically have small microchannels where fluid motion is dominated by interfacial forces and not by gravity. Round capillary channels are typically less than 1 mm in radius, while square- or rectangularly-shaped microchannels are typically less than 1 mm in width and less than 100 $\mu$m in depth. In many preferred embodiments, the microchannels have widths between 1 mm and 10 $\mu$m, and the depth of these microchannels is between 10 and 25 $\mu$m.

Devices of the invention may be configured to be compatible with modem methods of fabricating devices such as microelectromechanical systems (MEMS), microarrays of genes, and electronics equipment. These include such methods as reactive ion etching, wet etching, micromachining, lithography (photo and X-ray), sputter deposition of materials, chemical vapor deposition (CVD) of materials including plasma-enhanced CVD and low-pressure CVD, and thus such devices can provide high-performance operation and superior reliability. Certain devices of the invention may also be made by other methods such as injection molding or embossing of polymers.

All references discussed in this application, including patents, applications, and articles, are incorporated by reference in their entirety for all purposes as if fully put forth herein and especially for their content as indicated by the context in which they are discussed. Certain references are provided below as examples in which the invention may be incorporated, and thus incorporation by reference of these references includes incorporation of discussion on the manner of making and using the devices disclosed in those references as well as information on the devices themselves.

The noun "pump" is used herein to describe a device that moves fluids through application of some force, regardless whether the force is pressure or some other force, and the verb "pump" likewise is not limited to pressurizing a fluid to move it.

BRIEF DESCRIPTION OF THE DRAWINGS

Relationships of this invention to the field and several representative embodiments thereof will be readily understood by the subsequent detailed description including references to the accompanying drawings, wherein like reference tags refer to equivalent structural members within the accompanying drawings.

Figure 1:
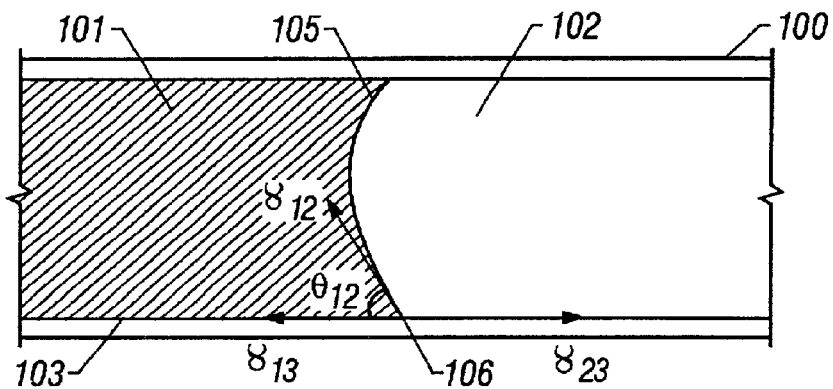
FIG. 1 illustrates a fluid-fluid interface in a microchannel.

Although the figures depict electrodes in certain positions such as at the bottom, on the sides, or above or beneath channels, the electrodes may be positioned in any convenient location in relation to the channels so long as the electrodes provide the designated effect. The electrodes may further be arranged in different ways with respect to the fluids, according to the requirements of the motive force used, as described herein.

Also, the electrodes are shown in the figures as connected to a DC voltage source. In the invention, the voltage signal applied to the electrodes may be DC, AC, a combination of the two, and may further be modulated, depending on the requirements of the motive force used and on the details of the device, such as, e.g., size, geometry, and material properties of the fluids.

The electrodes may further be in direct contact with the fluid or fluids, or they may be separated from them by a thin passivation layer or layers (e.g., a 1-$\mu$m film of $SiO_2$), depending on the motive force used and on the details of the device. For example, a passivation layer or layers may not be present when flow of DC electrical current through one or more fluids is desired. Conversely, a passivation layer or layers may be present in cases where such flow of electrical current is unnecessary or detrimental, or to prevent electrochemical reactions at the electrode surfaces.

Further, certain figures illustrate an optical device in which the fluid channel is separated from the core of an optical waveguide by a thin layer. This layer may or may not be present in the invention, and thus the fluid channel may reside directly on the core or may be separated from it by, e.g., a portion of waveguide cladding material in the various embodiments of the invention.

DETAILED DESCRIPTION OF PREFERRED EMBODIMENTS

Several embodiments are discussed below and with reference to the attached drawings. These descriptions and drawings provide examples of certain embodiments of the invention and are not to be construed as limiting the scope of the invention. Instead, the invention is to be accorded the breadth as described herein and as defined in the claims that form part of this specification.

One factor in the operation of devices according to this invention is the ability to displace small volumes of liquid, in some cases only a few picoliters, in response to an electrical signal. Fluids can be moved by dielectric pumping or variable dielectric pumping, in which a difference in capacitance is used to move two dielectric fluids in contact with one another. Moving the fluid or fluids according to the principles disclosed herein can provide the low power dissipation and the material versatility sought of a preferred embodiment of this invention.

Following is a detailed description of the basic physics of dielectric pumping and variable dielectric pumping, followed by a description of some channel configurations in which these microfluidic effects can be incorporated and embodied. Next is a description of devices that can be formed using these microfluidic effects and channel configurations, followed by a description of methods of fabricating the devices.

Physics of Microfluidics

When fluids are confined to microchannels, a dominant role is played by interfacial forces, which act at boundaries between different phases of the same medium (e.g., liquid-vapor) or between different media (e.g., solid-liquid, liquid-liquid, solid-gas, or liquid-gas). To portray microfluidic behavior, the concepts of surface energy and surface tension are useful [e.g., see J. Israelachvili, *Intermolecular and Surface Forces*, $2^{nd}$ ed. (Academic Press, London, 1991); A. W. Adamson and A. P. Gast, *Physical Chemistry of Surfaces*, $6^{th}$ ed. (Wiley, New York, 1997)].

From a microscopic perspective, an atom or molecule at a surface experiences a different local environment compared to one in the bulk. This asymmetry can be represented by the surface energy $\gamma$, which is defined as the increase in the Gibbs free energy of a thermodynamic system due to a unit increase in surface area. Surface energy (energy per unit area, $J/m^2$) and surface tension (force per unit length, N/m) are two interpretations of the same quantity, and are dimensionally and numerically equivalent.

The surface energy of a material (e.g., medium i) in vacuum is indicated with $\gamma_i$. When two dissimilar materials 1 and 2 are in contact, their interfacial energy $\gamma_{12}$ is given by the Dupré equation:

$$\gamma_{12} = \gamma_1 + \gamma_2 - W_{12} \qquad \text{(Eq. 1)}$$

where $W_{12}$ is the work of adhesion per unit area needed to separate, in vacuum, media 1 and 2 from mutual contact. A more general form of the Dupré equation relates $W_{132}$, the work of adhesion per unit area of media 1 and 2 in medium 3 (where 3 is something other than vacuum), to the pairwise interfacial energies of the three media:

$$W_{132} = \gamma_{13} + \gamma_{23} - \gamma_{12} \qquad \text{(Eq. 2)}$$

For the purposes of the invention, the case of three media is particularly important. The devices described herein typically involve at least a solid (e.g., the microchannel wall), a liquid, and either another liquid or a gas or vapor. This situation is depicted in FIG. 1, which shows a cross-section through three-phase contact line 106 in microchannel 100. Here 101 is a liquid (medium 1 in Eq. 2), 102 is a gas (medium 2), and 103 is the solid wall (medium 3). In addition to the interfacial tensions, the behavior of this system is characterized by the contact angle $\theta_{12}$ measured through medium 1; for equilibrium, the free energy of the system must be minimized with respect to variations in $\theta_{12}$. This requirement leads to the Young-Dupré equation:

$$\gamma_{13} + \gamma_{12} \cos\theta_{12} = \gamma_{23} \qquad \text{(Eq. 3)}$$

which expresses the intuitive notion that the interfacial tensions must be mechanically balanced at the contact line. A liquid is said to wet a solid surface if the contact angle is less than 90°.

The presence of an interfacial tension $\gamma_{12}$ at the boundary 105 between media 1 and 2 means that, if the interface is curved, there will be a pressure step $P_{cap}$ across it called capillary pressure. This is encapsulated in the Young-Laplace equation:

$$P_{cap} = \gamma_{12}\left(\frac{1}{R_A} + \frac{1}{R_B}\right), \quad \text{(Eq. 4)}$$

where $R_A$ and $R_B$ are the principal radii of curvature of the interface. The sign of the pressure difference is such that the pressure on the convex side is higher. The shape and, hence, the curvature of the interface depend primarily on three factors: the geometry of the confining boundaries, the interfacial tension, and the contact angle. For zero contact angle, the radius of curvature adopted by an interface spanning a microchannel of width a is approximately $R=a/2$; a finite contact angle modifies this to $R=a/(2\cos\theta_{12})$. In the devices of the invention, the microchannels typically have an approximately rectangular cross-section, so $$P_{cap} = 2\gamma_{12}\cos\theta_{12}\left(\frac{1}{w} + \frac{1}{d}\right), \quad \text{(Eq. 5)}$$

where w is the width and d is the depth of the microchannel.

Normally the pressure step $P_{cap}$ is associated with the rise (or fall) of the liquid level, under gravity, in a capillary tube dipped into an open reservoir. In a microfluidic system, however, the weight of the fluid plays a minor role. The equilibrium state of a microfluidic device has more to do with the configuration of the channels and any reservoir pressures. For example, if a uniform microchannel forms a closed loop, the capillary pressure steps across all the fluid-fluid interfaces add up to zero around the loop, at equilibrium. This kind of configuration makes for a so-called self-latching system, where the fluids move in response to a stimulus and remain in their new position after the stimulus is removed. If, on the other hand, a single microchannel connects two separate, sealed reservoirs, the hydrostatic pressures in the reservoirs provide a restoring force against fluid movement in the channel. This second kind of configuration constitutes a so-called semi-latching system, where the fluids return to their original position once the stimulus is removed. The stimulus is in either case represented by additional forces or pressures, introduced by the microfluidic motive force used, that alter the equilibrium state of the system.

The small channel sizes and the comparatively low speeds of fluid flow in microfluidic systems mean that the flow is typically characterized by a low Reynolds number, which measures the relative importance of inertial and viscous forces. This implies that the flow is laminar and dominated by viscous forces. As pressure changes develop due to dielectric pumping or variable dielectric pumping (to be described below), the fluid accelerates until viscous losses balance the driving force. The expression describing the fluid flow in a channel at low Reynolds numbers, while known, is cumbersome; here we present as an example the simplified case of a channel where the width w is much greater than the depth d. The viscosity is then dominated by the smaller dimension d, and the average steady fluid speed $\tilde{V}$ due to a pressure difference $\Delta P$ becomes $$\tilde{v} = \frac{\Delta P d^2}{12 \mu L}, \quad \text{(Eq. 6)}$$

where $\mu$ is the fluid dynamic viscosity and L is the length of the channel

In the field of the invention, the flow may further depart from this approximate expression due to the presence of interfaces between dissimilar fluids, due to the finite extent of a fluid segment (a slug) or segments within an otherwise gas-filled microchannel, or due to the presence of bends or cross-sectional variations in the microchannels. Further, in some devices of the invention, it may be desirable to apply (turn on) the motive force only for brief intervals of time, during which the flow may or may not become fully developed. The expression embodied in Eq. 6 is, therefore, to be understood as an order-of-magnitude indicator of the flow speeds involved.

Table 1 provides a selection of physical properties of fluids that may be used in the invention. Quoted values are compiled from several sources and have varying degrees of accuracy; blank boxes indicate that a value was not available. The physical properties of fluids listed in Table 1 are: the refractive index $n_D$ (measured at the sodium line, $\lambda_D=589.3$ nm); the density $\rho$; the melting and boiling points, respectively $T_m$ and $T_b$; the dynamic viscosity $\mu$; the surface energy $\gamma$, and the dielectric constant $\epsilon$. Also listed are the cohesive energy densities $\delta_d$, $\delta_p$, and $\delta_n$, respectively indicating the contributions from dispersion forces, polarization forces, and hydrogen bonding. These can be used, in techniques known to those skilled in the art, to estimate the mutual miscibility of different fluids or the solubility of other substances in a fluid, and the properties of the resulting mixtures or solutions. Additional properties not listed in Table 1, but that may be relevant to the choice of fluids for a device, include electrical conductivity and formation of polarizable interfaces. The fluids are chosen based on individual properties (e.g., low viscosity to reduce drag during actuation), as well as based on the properties of fluids in combinations (e.g., low miscibility to prevent large shifts in the material properties of the individual fluids).

TABLE 1

Selected physical properties of fluids that may be used in the invention, $\eta_D$: refractive index at the sodium D line; $\rho$: density; $T_m$: melting point; $T_b$: boiling point; $\mu$: viscosity; $\gamma$: surface tension; $\epsilon$: dielectric constant; $\delta_d$, $\delta_p$, $\delta_h$: cohesive energy densities.

| | property | | | | | | | | | |
|---|---|---|---|---|---|---|---|---|---|---|
| fluid | $\eta_D$ | $\rho$ $10^3$ kg/m$^3$ | $T_m$ °C. | $T_b$ °C. | $\mu$ $10^{-3}$ Ns/m$^2$ | $\gamma$ $10^{-3}$ N/m | $\epsilon$ | $\delta_d$ J$^{1/2}$/cm$^{3/2}$ | $\delta_p$ J$^{1/2}$/cm$^{3/2}$ | $\delta_h$ J$^{1/2}$/cm$^{3/2}$ |
| acetone | 1.359 | 0.792 | −95 | 57 | 0.32 | 23.7 | 20.85 | 15.5 | 10.4 | 7.0 |
| acetonitrile | 1.346 | 0.783 | −42 | 82 | 0.35 | 29.3 | 37.00 | 15.8 | 18.0 | 6.1 |

TABLE 1-continued

Selected physical properties of fluids that may be used in the invention,
$\eta_D$: refractive index at the sodium D line; $\rho$: density; $T_m$: melting point;
$T_b$: boiling point; $\mu$: viscosity; $\gamma$: surface tension; $\epsilon$: dielectric constant; $\delta_d$,
$\delta_p$, $\delta_h$: cohesive energy densities.

| | | | | | | | | | | |
|---|---|---|---|---|---|---|---|---|---|---|
| | | | | | | property | | | | |
| fluid | $\eta_D$ | $\rho$ $10^3$ kg/m$^3$ | $T_m$ °C. | $T_b$ °C. | $\mu$ $10^{-3}$ Ns/m$^2$ | $\gamma$ $10^{-3}$ N/m | $\epsilon$ | $\delta_d$ J$^{1/2}$/cm$^{3/2}$ | $\delta_p$ J$^{1/2}$/cm$^{3/2}$ | $\delta_h$ J$^{1/2}$/cm$^{3/2}$ |
| acetophenone | 1.534 | 1.026 | 20 | 202 | 1.62 | 39.8 | 17.39 | 18.0 | 8.6 | 3.7 |
| benzene | 1.501 | 0.879 | 6 | 80 | 0.60 | 28.9 | 2.28 | 18.1 | 1.0 | 2.0 |
| bromobenzene | 1.560 | 1.499 | −31 | 156 | 0.99 | 36.5 | 5.40 | 20.5 | 5.5 | 4.1 |
| 1-bromonaphthalene | 1.658 | 1.488 | 3 | 281 | 4.52 | 44.2 | 5.12 | 19.6 | 3.1 | 4.1 |
| butyrolactone | 1.434 | 1.129 | −44 | 206 | 1.70 | 58.2 | 39.00 | 19.6 | 16.6 | 7.4 |
| carbon tetrachloride | 1.463 | 1.595 | −25 | 77 | 0.88 | 27.0 | 2.24 | 16.9 | 0.0 | 0.0 |
| chlorobenzene | 1.525 | 1.107 | −50 | 132 | 0.80 | 33.6 | 5.71 | 18.9 | 4.3 | 2.1 |
| cyclohexane | 1.429 | 0.779 | 7 | 81 | 0.90 | 25.5 | 2.02 | 16.7 | 0.0 | 0.0 |
| cyclohexanol | 1.466 | 0.962 | 24 | 162 | 56.20 | 33.9 | 15.00 | 17.4 | 4.1 | 13.5 |
| cyclohexanone | 1.451 | 0.973 | −24 | 156 | 1.80 | 34.5 | 18.30 | 17.7 | 8.4 | 5.1 |
| decahydronaphthalene | 1.476 | 0.883 | −37 | 191 | 2.80 | 31.1 | — | 18.4 | 0.0 | 0.0 |
| 1,2-dichloroethane | 1.444 | 1.257 | −35 | 84 | 0.73 | 24.2 | 10.65 | 18.1 | 5.3 | 4.1 |
| diethyl ketone | 1.394 | 0.816 | −42 | 103 | 0.44 | 25.1 | 17.00 | 15.7 | — | — |
| dimethylacetamide | 1.438 | 0.937 | −20 | 166 | 0.92 | 34.0 | 37.78 | 16.8 | 11.5 | 10.2 |
| dimethylformamide | 1.427 | 0.949 | −58 | 153 | 0.80 | 37.4 | 36.16 | 17.4 | 13.7 | 11.3 |
| dimethyl sulphoxide | 1.476 | 1.102 | 19 | 189 | 2.00 | 43.5 | 46.68 | 18.9 | 16.4 | 10.2 |
| ethanol | 1.362 | 0.789 | −116 | 79 | 1.08 | 22.8 | 24.30 | 15.8 | 8.8 | 19.5 |
| ethylbenzene | 1.498 | 0.867 | −93 | 135 | 0.64 | 29.2 | 2.41 | 17.3 | 0.6 | 1.4 |
| ethylene glycol | 1.427 | 1.113 | −14 | 199 | 17.40 | 47.7 | 35.85 | 16.9 | 11.1 | 26.0 |
| formamide | 1.445 | 1.134 | 3 | 211 | 3.30 | 58.2 | 109.00 | 17.2 | 26.2 | 19.0 |
| glycerol | 1.473 | 1.260 | 18 | 290 | 950.00 | 63.4 | 42.50 | 17.3 | 12.1 | 29.3 |
| heptane | 1.386 | 0.684 | −91 | 98 | 0.39 | 20.3 | 1.92 | 15.2 | 0.0 | 0.0 |
| hexane | 1.375 | 0.660 | −94 | 69 | 0.29 | 18.4 | 1.89 | 14.8 | 0.0 | 0.0 |
| isobutyl acetate | 1.388 | 0.871 | −99 | 116 | 0.65 | 23.7 | 5.29 | 15.1 | 3.7 | 7.6 |
| isobutyl alcohol | 1.397 | 0.801 | −108 | 107 | 3.57 | 23.0 | 17.70 | 15.2 | 5.7 | 16.0 |
| methanol | 1.331 | 0.792 | −98 | 65 | 0.55 | 22.6 | 33.62 | 15.2 | 12.3 | 22.3 |
| 2-methoxyethanol | 1.400 | 0.966 | −85 | 124 | 1.60 | 35.0 | 16.93 | 16.2 | 9.2 | 16.4 |
| nitrobenzene | 1.553 | 1.204 | 6 | 211 | 2.03 | 43.9 | 35.87 | 18.8 | 12.3 | 4.1 |
| nitroethane | 1.390 | 1.052 | −70 | 115 | 0.64 | 32.2 | 28.00 | 16.3 | 15.6 | 4.5 |
| nitromethane | 1.380 | 1.130 | −29 | 101 | 0.62 | 36.8 | 38.57 | 16.1 | 18.8 | 5.1 |
| N-methyl-2-pyrrolidone | 1.468 | 1.028 | −20 | 202 | 1.67 | 41.8 | 32.00 | 17.9 | 12.3 | 7.2 |
| nonane | 1.405 | 0.718 | −53 | 151 | 0.50 | 19.0 | 2.00 | 15.5 | 0.0 | 0.0 |
| perfluorooctane | 1.300 | 1.766 | −25 | 103 | 0.70 | 16.0 | 2.00 | 12.5 | 0.0 | 0.0 |
| propylene carbonate | 1.421 | 1.201 | −49 | 242 | 2.80 | 40.5 | 65.00 | 20.1 | 18.0 | 4.1 |
| pyridine | 1.509 | 0.982 | −42 | 115 | 0.88 | 38.0 | 12.30 | 19.5 | 8.8 | 5.9 |
| 1,1,1-trichloroethane | 1.438 | 1.325 | −31 | 74 | 0.80 | 25.6 | 7.53 | 16.8 | 4.3 | 2.0 |
| water | 1.333 | 0.998 | 0 | 100 | 0.89 | 72.8 | 80.37 | 12.8 | 31.3 | 34.2 |
| m-xylene | 1.497 | 0.864 | −50 | 139 | 0.58 | 28.9 | 2.37 | 17.1 | 1.0 | 1.0 |
| o-xylene | 1.506 | 0.880 | −28 | 144 | 0.77 | 30.1 | 2.57 | 17.2 | 1.0 | 1.0 |
| p-xylene | 1.496 | 0.861 | 13 | 138 | 0.61 | 28.4 | 2.27 | 17.0 | 1.0 | 1.0 |

A device of the invention may be designed where only two fluids are employed, chosen on the basis of their physical properties relevant for the motive force used and their activity or properties for the particular application, as discussed below. For example, when moving fluids by dielectric pumping, the dielectric constant of the fluids is a critical property, while the absorption spectrum of one or both fluids may be central in an application involving chemical or biological assays. In some cases, however, the constraints on fluid activity or properties posed by the operational function and the constraints on other physical properties posed by the motive force may be incompatible. That is, there may not be two fluids that possess both the desired physical properties needed for the particular motive force to be used and the desired activity or properties for another purpose sought in moving the fluids. It becomes advantageous, then, to use separate fluids for the actuation function and for the other function to be supplied when moving the fluids. In this way fluids may be selected for their abilities to be moved by the desired motive force, and other fluids may be chosen for the other properties required of the device in which the fluids are to be utilized. Thus, each function can be independently optimized, yielding a potentially superior device.

In some cases, a pure fluid may not exist with a value of a relevant physical property falling within the desired range. It is possible, then, to mix two or more fluids to obtain a mixture with the desired property. For example, propylene carbonate can be mixed with quinolin to yield a mixture with an index intermediate between the 1.41 of propylene carbonate and the 1.7 of quinolin.

Other properties of a fluid used may likewise be controlled by adding soluble materials. For example, dissolving a surfactant such as Triton-X or FC430 in water reduces the surface tension, which is an important property in microfluidic devices in general. Also, dissolving a salt such as potassium chloride in water increases the electrical conductivity, a critical property, for example, in some application that may also include electrokinetic actuation principles.

Additional modifications of physical properties of a fluid may be achieved by suspending microscopic solid particles in it. The particles may be magnetic, enabling an applied magnetic field to interact with the fluid for diagnostic or other purposes. The particles may also be nanoparticles or, for instance, quantum dots that emit light of a given wavelength dependent on the size of the dot. The particles may also be introduced in the form of a colloidal suspension. The colloidal suspension disperses light that propagates through the fluid by scattering and thus can attenuate the optical signal that passes into the colloid. The particles may further be absorbers, enabling the resulting fluid to attenuate the optical field by absorption.

Further, it may be desirable, in designing a device of the invention, to alter the physical properties of the surfaces that contact the fluids. The three-phase contact angle $\theta_{12}$, for example, can be affected not only by modifying the surface energies of the fluids, but also by modifying the surface energy of the microchannel walls (Eq. 3). One possibility is to treat the microchannel surfaces with compounds known to change the surface chemistry, such as nitric acid or hydrogen peroxide. Another possibility is to coat the microchannel walls with a thin film of a silane coupling agent, a fluorocarbon, or a fluoropolymer in order to reduce the surface energy. For example, a channel cut into the surface of silica (which has a surface energy of approximately 0.300 N/m) can be coated with a molecular layer of a silane coupling agent, a fluorocarbon, or a fluoropolymer having a surface energy of less than 0.020 N/m. Where it is important to minimize the contribution of capillary forces, it is preferable to choose or modify the various interface energies to yield a three-phase contact angle that is approximately 90° (Eq. 5).

It is also possible to selectively treat or coat different portions of the microchannel in order to achieve the desired balance between surface interactions and actuation forces. For example, one may coat only the top of the microchannel with a thin film of, e.g., a silane coupling agent, a fluorocarbon, or a fluoropolymer, that reduces the surface energy. This yields a different contact angle on the top than on the sides and bottom of the microchannel, allowing control of the shape and curvature of the fluid-fluid interface. One may also coat segments of a microchannel but not others, effectively introducing position-dependent surface interactions that can be used in the design of a device for enhancing the movement of a fluid slug at certain positions and stopping or hindering the movement at others. The advancing or receding interface of a fluid slug requires more energy to pass a discontinuity on the surface than is required to move on a smooth surface. For example, a fluid interface such as a water/air interface may move along a silica surface by capillary pressure (with $\theta_{12}=0°$), but stops when encountering a low-surface-energy feature such as a narrow, thin strip of a silane coupling agent, a fluorocarbon, or a fluoropolymer laid across the channel (because $\theta_{12}$ exceeds 100°). Movement resumes when sufficient additional pressure is applied to overcome this irregularity and move the water/air interface past it.

In addition, in many systems, the three-phase contact angle $\theta_{12}$ is not uniquely defined: it may depend, for example, on whether the fluid-fluid interface is static or moving in one direction or the other. The difference between advancing and receding contact angles, known as the contact-angle hysteresis, is an extra source of energy dissipation. To minimize the hysteresis, one can carry out surface treatments on the microchannel walls with, e.g., nitric acid or hydrogen peroxide, or one may coat the microchannel surfaces with a thin film of low-surface-energy materials such as silane coupling agents, fluorocarbons, or fluoropolymers. Bringing the average contact angle close to 90° (as described above, e.g., by using surface treatments or by the choice of materials) helps to alleviate problems associated with contact-angle hysteresis, as the overall contribution of capillary forces is thereby minimized.

Dielectric Pumping

The energy stored in a parallel-plate capacitor is $$U_{cap} = \frac{1}{2}CV^2, \qquad (\text{Eq. 7})$$

where C is the capacitance and V is the voltage (potential) drop across the capacitor. The capacitance C is given by $$C = \frac{\varepsilon_0 \varepsilon A}{d}, \qquad (\text{Eq. 8})$$

where A is the surface area and d is the separation of the two plate electrodes, $\varepsilon$ is the dielectric constant of the material between the electrodes, and $\varepsilon_0$ is the permittivity of vacuum. It follows that $$U_{cap} = \frac{1}{2}\frac{\varepsilon_0 \varepsilon A}{d}V^2. \qquad (\text{Eq. 9})$$

The capacitive energy $U_{cap}$ is therefore a function of the dielectric constant $\varepsilon$ of the material between the parallel plates. This property can be used to exert a force on the interface between two fluids with different dielectric constants [e.g., see D. J. Griffiths, *Introduction to Electrodynamics*, $2^{nd}$ ed. (Prentice-Hall, Englewood Cliffs, N.J., 1989)]. We have exploited this effect in devising a novel microfluidic actuation principle, which we call dielectric pumping (DP).

Figure 2:
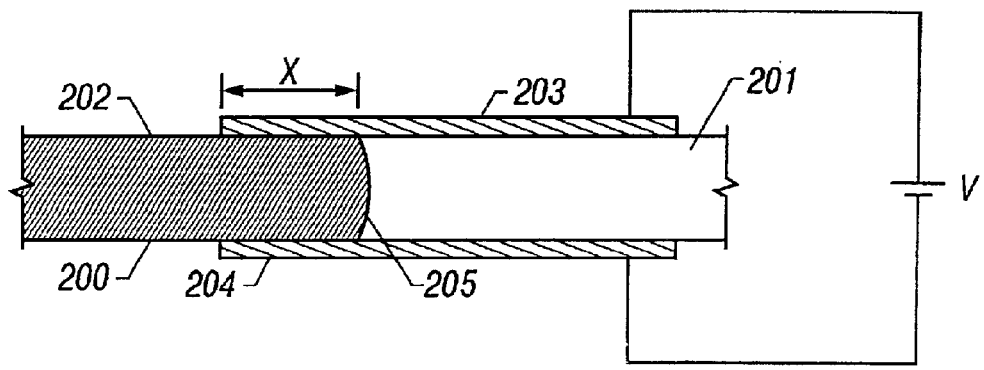
FIG. 2 illustrates a microchannel configured to move fluids using dielectric pumping (i.e., a dielectric pump).

Referring to FIG. 2, microchannel 200 contains fluid 202 (e.g., a high-dielectric-constant liquid such as propylene carbonate) and fluid 201 (e.g., a low-dielectric-constant gas such as air, or liquid such as perfluorooctane). The interface 205 between the two fluids is placed in the region of the microchannel between the two electrodes 203 and 204, which form a capacitor. As a DC voltage V is applied between the electrodes, the fluid with higher dielectric constant is drawn into the capacitor region, causing fluid motion.

The approximate pressure generated by DP can be calculated by looking at how the energy stored in the capacitor varies as interface 205 moves. From Eq. 7, the total energy U of the system for a fixed voltage V, written as a function of the interface position X, is $$U(x) = \frac{1}{2}C(x)V^2 - Q(x)V = -\frac{1}{2}C(x)V^2, \qquad (\text{Eq. 10})$$

where the first term is the energy stored in the capacitor, the second term is the work done by the external voltage source, and the charge in a capacitor is Q=CV. The capacitance C, from Eq. 8, is $$C(x) = \frac{\varepsilon_0 w}{d}[\varepsilon_2 x + \varepsilon_1(L-x)], \qquad (\text{Eq. 11})$$

where w is the width and L the length of the electrodes, d is the separation between the electrodes, and $\varepsilon_1$ and $\varepsilon_2$ are the dielectric constants of the two fluids. The force F on the interface is $$F = -\frac{dU}{dx} = \frac{1}{2}\varepsilon_0 \Delta\varepsilon \frac{V^2 w}{d}, \quad \text{(Eq. 12)}$$

where $\Delta\epsilon=(\epsilon_2-\epsilon_1)$ is the dielectric contrast. Finally, the resulting dielectric pumping pressure $\Delta P$ is $$\Delta P = \frac{F}{wd} = \frac{1}{2}\varepsilon_0 \Delta\varepsilon \frac{V^2}{d^2}. \quad \text{(Eq. 13)}$$

Notice that the pressure depends on the square of the electric field E=V/d within the capacitor. This expression is approximate because it neglects, for instance, the effects due to the curvature of the interface between the electrodes. It also neglects the fact that the electric field profile inside a real capacitor is not uniform, particularly close to the edges and in the vicinity of a dielectric step like interface 205. However, this expression is valid generally.

The fluids used in a DP-based device are selected primarily to provide a desired dielectric contrast ($\Delta\epsilon$ in Eq. 13) between the two fluids. Another consideration is the electrical conductivity of the fluid. Since the DP effect is based on the dielectric polarization of the fluids, any significant concentration of ions in the fluids will tend to reduce or eliminate the effect. This is because in the presence of an electric field in the capacitor, the ions migrate to the electrodes (to form electric double layers) and partially shield the field in the bulk fluid. The result is a lower degree of polarization of the dielectric material inside the capacitor. Therefore, a DP-based device will incorporate suitably low-conductivity materials to maximize the dielectric pumping pressure $\Delta P$.

Because the DP pressure depends on $V^2$, it is also possible to use an AC voltage. When using materials with nonnegligible conductivity, one may therefore actuate the device using an AC voltage with a frequency high enough to prevent formation of the electric double layers. AC signals may also be used to prevent electrochemical reactions at the electrode surfaces. In order to further protect the electrodes, a thin insulating layer (e.g., silicon oxide, polymer, silicate, or other glass) may be deposited on the electrodes.

Variable Dielectric Pumping

The DP-based device described above performs a one-way microfluidic actuation. In order to reverse the direction of motion, either a restoring force (e.g., compression or expansion of a reservoir) or an additional, separately actuated pair of electrodes may be used. We have devised a different application of the DP principle, where a variable voltage is used to move fluids to a specified location. This modification enables reversible motion in a single actuation unit without relying on a restoring force. We call this variable dielectric pumping (VDP).

Figure 3:
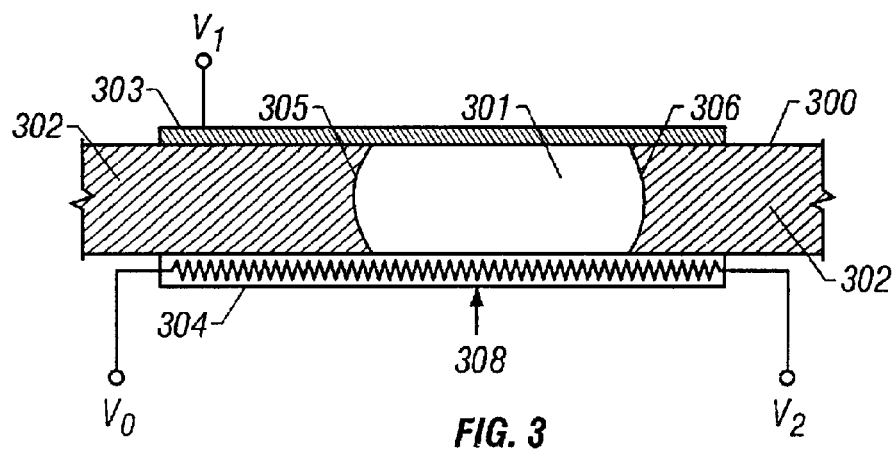
FIG. 3 illustrates a microchannel in which fluids are moved using variable dielectric pumping.

A scheme of a device based on VDP is presented in FIG. 3. Microchannel 300 holds low-dielectric-constant fluid slug 301 (e.g., air) surrounded by high-dielectric-constant fluid 302 (e.g., propylene carbonate), with both interfaces 305 and 306 in the capacitor region defined by electrodes 303 and 304. Electrode 304 is designed to have a substantial resistance, so that different voltages $V_0$ and $V_2>V_0$ can be applied at the ends without dissipating excessive amounts of electrical power (e.g., no more than a few milliwatts). A voltage $V_1$, intermediate between $V_0$ and $V_2$, is applied to electrode 303. Because of the resistive voltage drop, at point 308 along electrode 304 (determined by the relationship between $V_0$, $V_1$, and $V_2$) the voltage level is equal to $V_1$. Away from this point, the voltage on the electrode decreases towards $V_0$ and increases toward $V_2$.

The electric field defined by this voltage structure is not uniform as in a common capacitor. The field strength (absolute value) is lowest in the region around point 308, and increases as one moves away from it. Because the DP effect tends to move fluids with high dielectric constant to regions of high field strength and vice versa, low-dielectric-constant fluid slug 301 is drawn to the low-field-strength region around point 308. Changing the applied voltage $V_1$ while keeping $V_0$ and $V_2$ fixed results in moving point 308, where the voltage equals $V_1$, to a new location; slug 301 moves in turn to follow this point of lowest electric field strength.

Just as for dielectric pumping, the voltage used may be a DC voltage or may be an AC voltage. The frequency of the alternating current can be selected to prevent build-up of charge in the fluids in the vicinity of the electrodes, as was discussed for dielectric pumping above.

Structural Features and Fluids for a Device Incorporating DP and VDP

A device of the invention configured for DP or VDP typically has electrodes parallel to one another in order to form a capacitor. The electrodes are positioned near or in a fluid channel, since fluids are moved by an electric field established between the electrodes that creates a force on an interface between the fluids. The fluid interface is positioned in sufficient proximity to the electric field that the interface (and thus the fluids) can be moved to a new position by the electric field. This is typically a position between the two electrodes.

There are at least two fluids in a device configured to move fluids using DP or VDP. The two fluids have a sufficiently large difference in their dielectric constants ($\Delta\epsilon$ in Eq. 13) that an interface between the two fluids (and thus the two fluids themselves) can be moved by an electric field applied to the interface. As seen above, using AC voltages of appropriately high frequency (typically in the kilohertz range) extends the applicability of these motive forces to conductive liquids such as water, aqueous solutions, and electrolytes in general. A number of particular combinations of fluids are provided in the examples below as well as being apparent to one of ordinary skill from Table 1. Particular combinations of fluids that work especially well are aqueous liquids, suspensions, colloids, or slurries and either air or non-polar liquids that are immiscible in the aqueous phase. Examples include water and air, water and perfluorooctane, isobutyl acetate and perfluorooctane, and propylene carbonate and nonane. If DNA, RNA, or similar molecules are contained in the aqueous phase (with or without an alcohol to adjust the dielectric constant, for instance), it is preferred that the second fluid be air or an organic liquid that is immiscible in the aqueous phase and in which the nucleic acid has little solubility in order to minimize the amount of nucleic acid that either precipitates or migrates into the organic phase.

Figure 4:
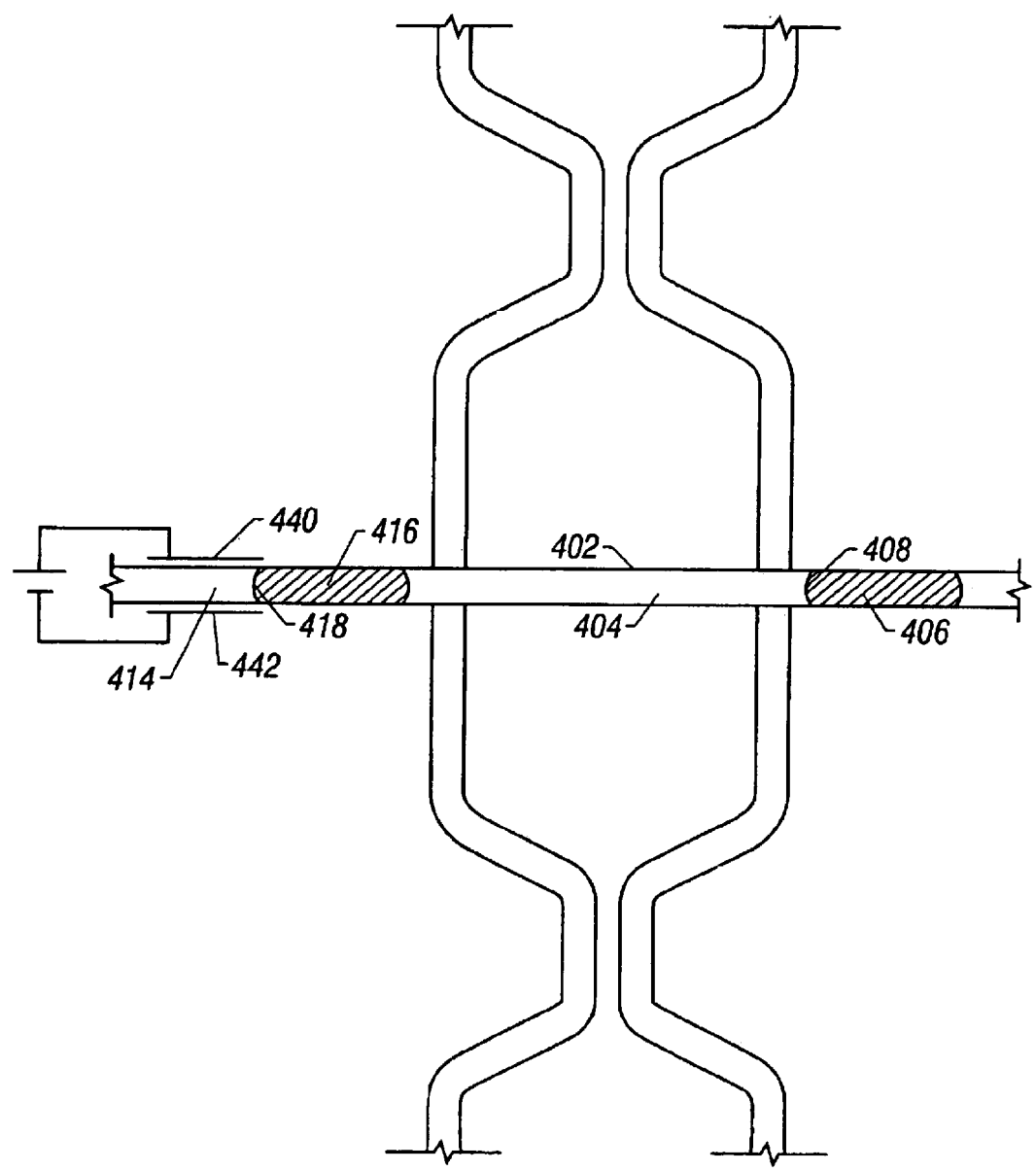
FIG. 4 illustrates an optical switch or shutter based on a Mach-Zehnder interferometer.

Fluids in the device form an interface in the vicinity of the electrodes, so that the electric field generated between the electrodes can act upon the fluid interface to move the fluids. It is also possible to use two fluids to move or apply a force on a third fluid. FIG. 4 illustrates one such system, in which fluids 414 and 416 form an interface 418 that is moved by the electrodes 440 and 442, and fluid 406 or 404 is moved to a desired position as a result of the movement of fluids 414 and 416. Additional fluids may be incorporated as desired, as discussed below for particular embodiments of the invention.

Figure 5:
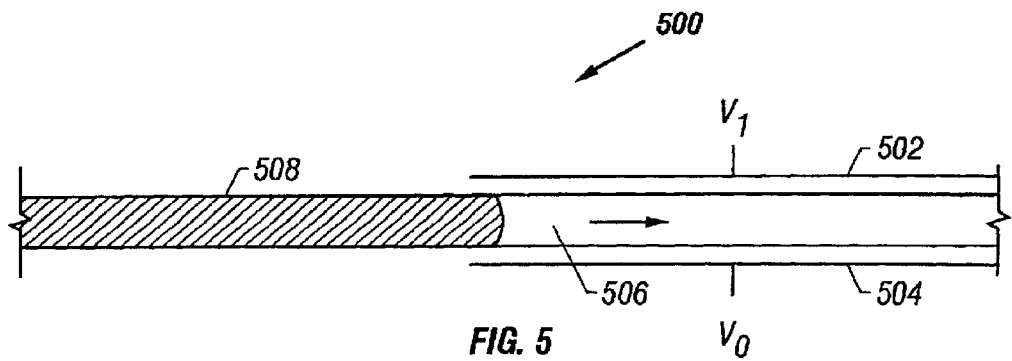
FIG. 5 illustrates a long microchannel in which dielectric pumping moves two fluids.
Figure 6:
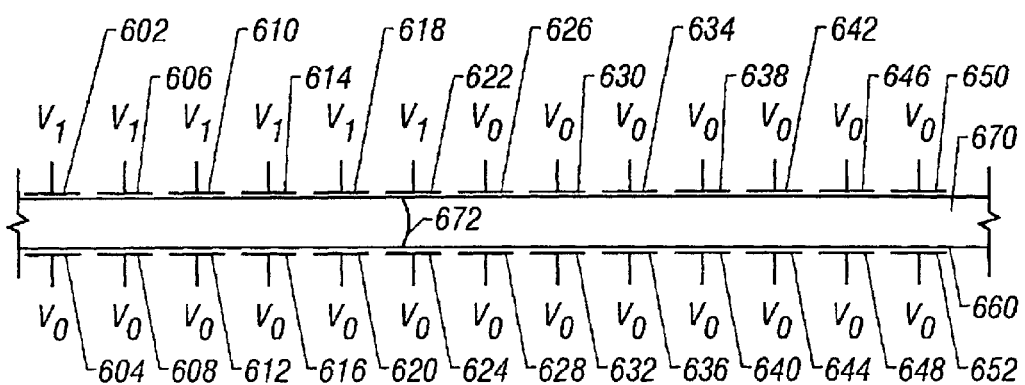
FIG. 6 illustrates a long microchannel having a large number of electrodes to move and position the fluids in the microchannel.

If the device is configured, as illustrated in FIG. 5, such that two of its electrodes 502 and 504 are at two different fixed voltages $V_0$ and $V_1$, the device 500 typically will move fluids 506 and 508 only in one direction in a channel. Electrodes 502 and 504 may be very long so that fluid motion is maintained along a long channel, as illustrated in FIG. 5. Electrodes may also be cascaded so that fluid motion through a channel is maintained or occurs in discrete increments so that small fluid slugs are administered from the end of the channel. For example, FIG. 6 illustrates a device in which multiple electrodes 602, 604, . . . , 650, 652 are positioned along a channel 660. Adjacent electrodes are separated from one another by a very small distance, and electrodes may be switched on or off individually to maintain or stop fluid motion along the channel. Thus, to administer a small known volume of fluid 670, electrodes 626 and 628 are placed at $V_1$ and $V_0$, respectively, to move fluid interface 672 to the next set of electrodes. Additional electrodes, such as 630 and 632, may be brought temporarily to voltages $V_1$ and $V_0$ to aid in drawing interface 672 to the ends of electrodes 626 and 628.

Figure 7:
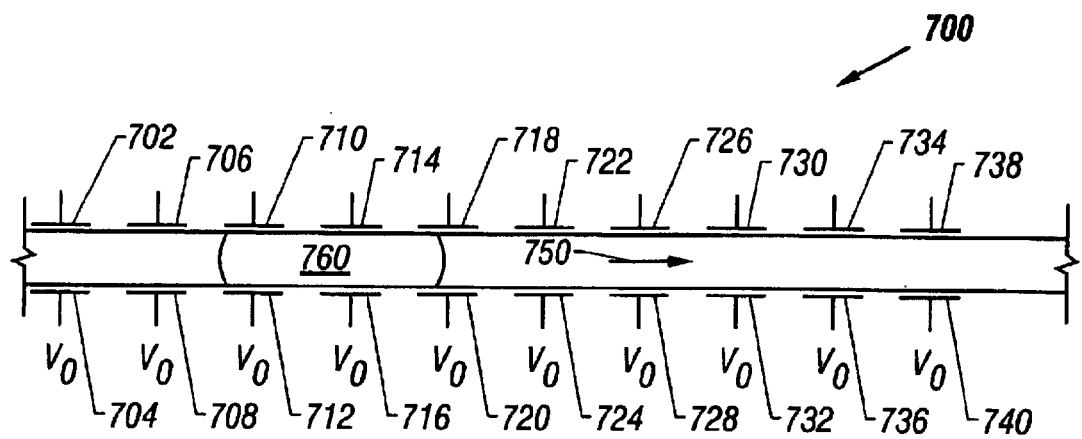
FIG. 7 illustrates a configuration in which flow may occur in either direction in the microchannel.

If a slug of fluid is moving through a device 700 as configured in FIG. 7, it is possible to reverse the direction that the slug is flowing in by selecting the voltages appropriately for the various sets of electrodes. For instance, as illustrated in FIG. 7, if electrodes 718, 722, 726, . . . are placed at $V_1$ and their corresponding electrodes 720, 724, 728, . . . are kept at $V_0$, fluid flow is in the direction of arrow 750. The slug 760 may be stopped by applying the same voltage to electrodes 718, 722, 726, . . . as is applied to their corresponding electrodes 720, 724, 728, . . . , and the direction that slug 760 moves may be reversed by applying a potential difference across electrodes 710, 706, 702, . . . and 712, 708, 704, . . . respectively.

In a configuration based on VDP, illustrated in FIG. 3, the device has two electrodes 303 and 304 in which electrode 304 is resistive and has two different voltages $V_0$ and $V_2$ at its ends, and in which a variable voltage $V_1$ is applied to electrode 303, as discussed above. Fluids can then move in both the forward and reverse directions in the channel between the electrodes by applying the appropriate voltage to electrode 303. Alternatively, voltage $V_1$ is kept fixed and either or both of voltages $V_0$ and $V_2$ are varied to cause fluid motion according. Beside providing for reversible motion with a single set of electrodes, this configuration has the desirable property of allowing to position one or more interfaces at desired locations along a channel simply by setting a particular voltage level. This property can also be useful when configuring a device to have fluid flow through one of multiple channels at a junction where channels branch.

The fluid resides, in whole or in part, within a fluid channel. As illustrated in FIG. 4, the fluid channel 402 may have ends that do not adjoin one another. At least one of the ends may be open to atmosphere, or the fluid channel may have at least one end open to a fluid reservoir that contains, for example, one of the fluids found in the channel and optionally a second fluid such as a gas, which compresses easily.

The fluid channel may also be configured as a continuous channel, so that fluids may be moved along the channel in one direction to return to their points of origin or may be moved forward and backward between different positions as desired. A channel (whether continuous or terminated) may contain as few as one or two interfaces between two dissimilar fluids or between two dissimilar phases of the same fluid, or it may contain many such interfaces.

One advantage of a loop or continuous channel configuration is that the channel can be configured so that the moving fluid stops and remains in its stopped position when the stimulus (such as an electric field in DP or VDP) is removed. A device so configured is thus self-latching. That is, once the state of the device is changed, the device remains in the changed state despite removing the stimulus that changed the state of the device. This type of device is self-latching regardless of how the device is oriented with respect to gravitational force when the continuous channel configuration is formed of microchannels. As discussed previously, the gravitational force on fluids in microchannels is negligible when compared with capillary and wetting forces in the channels, and fluids in such microchannels exhibit negligible or no movement regardless of whether the microchannels are oriented vertically or at some other angle to the horizontal. Consequently, one advantage of this configuration is that a stimulus is required only to change the state of the device, not to maintain the device in its changed state. A self-latching device is made to return to its previous state by applying a reverse stimulus.

Figure 8:
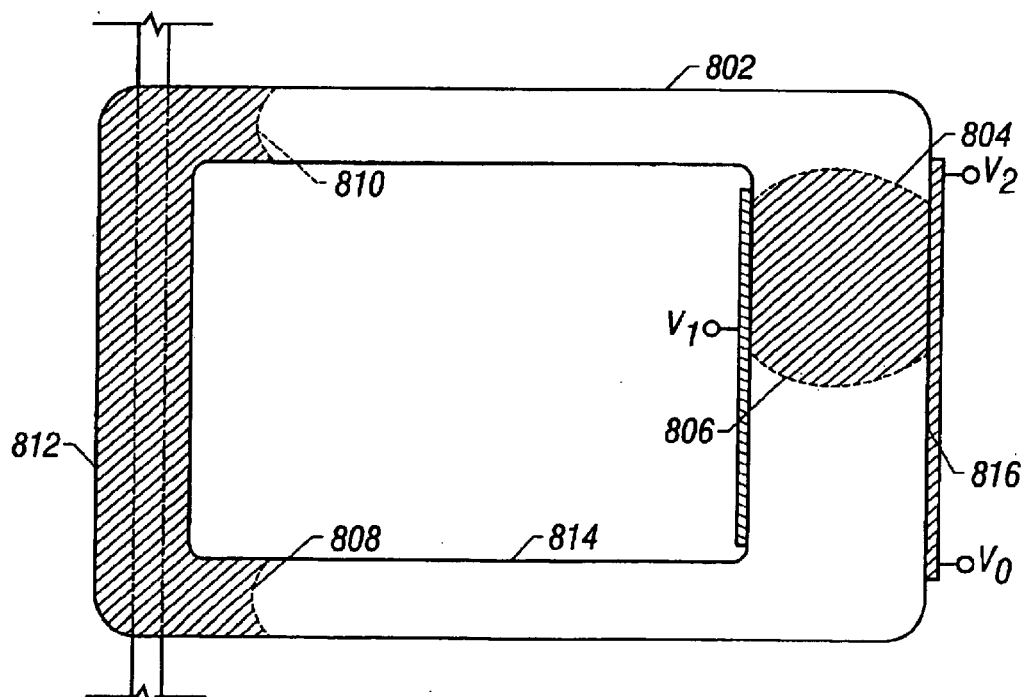
FIG. 8 depicts a closed or continuous fluid channel having various cross-sectional areas.

A device can be made self-latching by selecting the size and shape of the microchannels so that the fluids in the microchannel are under no net force in the direction of movement except when a stimulus (such as an electric field in DP or VDP) is applied. For example, a device having a continuous microchannel that has a constant cross-sectional area throughout is self-latching. A device composed of several microchannels, each of which has a constant cross-sectional area, but different from the others, as illustrated in FIG. 8, may be configured as self-latching by properly positioning the fluid interfaces 804, 806 and 808, 810 so that motion of each interface only occurs within a microchannel with constant cross-sectional area. Here, interfaces 804 and 806 remain in channel portion 816 having a first cross-sectional area, while interfaces 808 and 810 are formed in any of microchannel portions 802, 812, or 814 which each have the same cross-sectional area. A device having microchannels with a cross-sectional area that decreases or increases in the direction of fluid movement (i.e., tapered portions) may also be configured to be self-latching when each tapered portion is filled with a single liquid.

A device may be designed to be semi-latching rather than self-latching. In a semi-latching device, an interface between fluids moves to a new position when a stimulus (such as an electric field in DP or VDP) is applied, but the interface returns to the same resting position when the stimulus is removed. The return to equilibrium is due to the presence of a substantial restoring force in the device that acts in opposition to the actuation force or forces. Thus, in this type of device, a stimulus is applied to change and maintain the state of the device, but when the stimulus is removed, the device returns to its previous state without having to apply a reverse stimulus or control its magnitude. Instead, the restoring force is responsible for returning the device to its equilibrium state.

Figure 9:
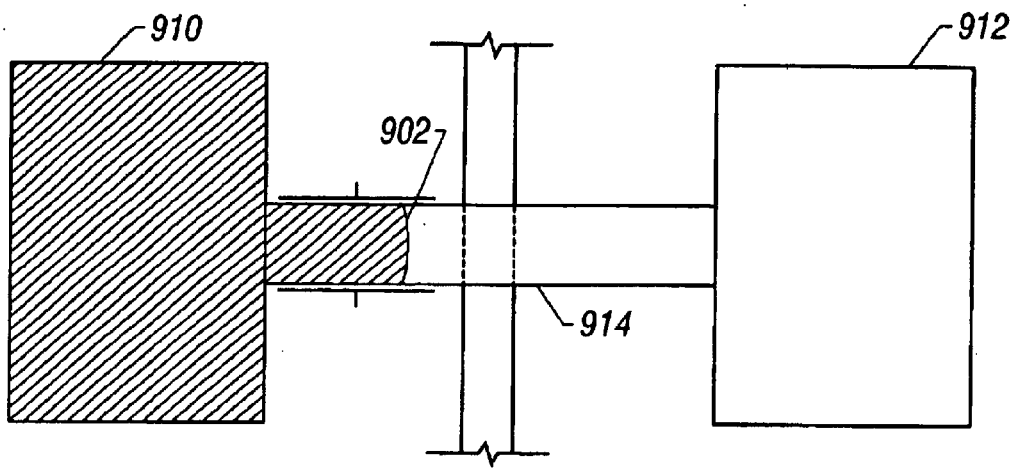
FIG. 9 illustrates an open or discontinuous fluid channel attached to two reservoirs at its ends.

An example of a semi-latching device is shown in FIG. 9. Here the restoring force is the compressibility of the fluids in reservoirs positioned at the ends of the channel. As interface 902 moves (e.g., to the right) under the action of DP or VDP, the fluid (or fluids) in reservoir 910 expands and the fluid (or fluids) in reservoir 912 compresses. This expansion and compression generates a differential pressure between the two reservoirs which balances the actuation pressure. When the actuation pressure is removed, the differential pressure moves interface 902 back to its equilibrium position. Because of their greater compressibility, in some instances it may be preferable to employ gases in a device of this kind. A gas may then fill one reservoir entirely, or two gases may fill the two reservoirs while being separated by an intervening liquid slug in channel 902, or gases may fill part of one or both reservoirs, the remaining part being filled with liquids. A device as illustrated in FIG. 9 can be made self-latching if an additional fluid channel between reservoirs positioned at each end of the channel (not illustrated in the figure for sake of clarity) is provided to prevent a differential pressure from being generated in the reservoirs when interface 902 moves through microchannel 914.

Figure 10:
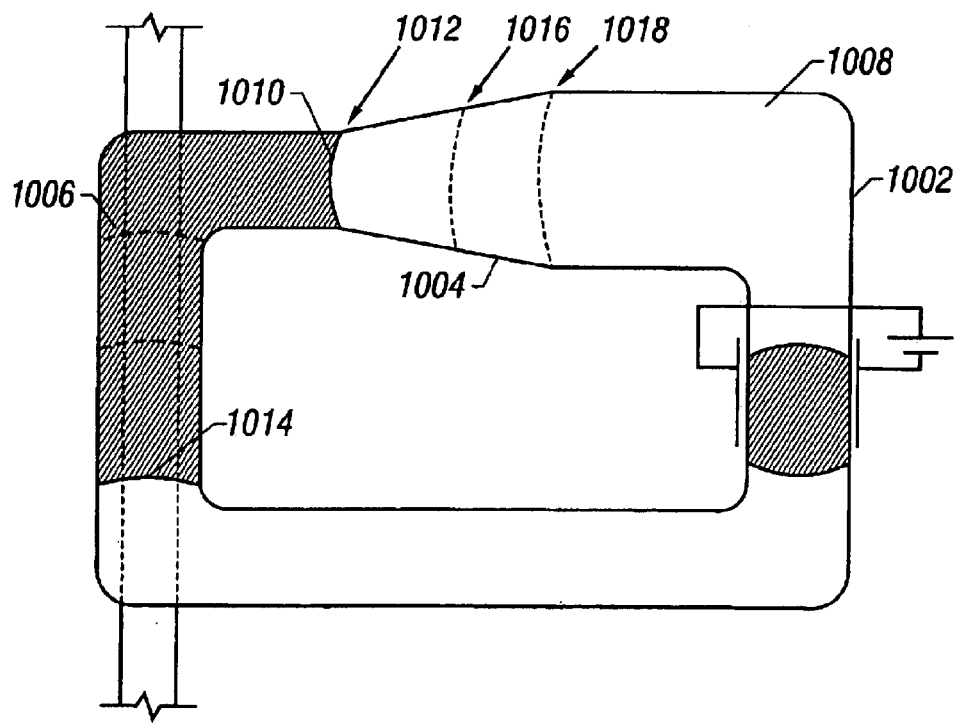
FIG. 10 illustrates a continuous fluid channel that is semi-latching due to a fluid interface being positioned in a tapering section of the microchannel.

Another example of a semi-latching device is shown in FIG. 10. The restoring force in this case is capillary pressure. Continuous channel configuration 1002 has a uniform cross-section, except in tapered region 1004. Fluids 1006 and 1008 are placed in the microchannels so that interface 1010 between fluids 1006 and 1008 is positioned at the narrow end 1012 of tapered region 1004. This is an equilibrium state as the capillary pressures at interfaces 1012 and 1014 are equal in magnitude. As fluids in the microchannels move clockwise due to DP or VDP, interface 1010 is forced into wider and wider portions (e.g., 1016, 1018, . . . ) of tapered region 1004. The resulting imbalance in capillary pressure across fluid slug 1006 acts as a restoring force against the actuation force. When actuation ceases, this differential pressure moves the fluids counterclockwise until interface 1010 returns to its equilibrium position 1012.

Devices Fabricated Using DP and VDP

Various devices can be fabricated to use dielectric pumping and variable dielectric pumping to move fluids. The following devices are illustrative and by no means exhaustive of the various applications to which DP and VDP can be applied.

Fluid Transport and Delivery

As discussed above for FIG. 5, fluid may be transported from one location to another using DP or VDP. For example, it may be desirable after heating a fluid to move it to a cooler location to prevent temperature-induced inaccuracies in readout. Fluid can be drawn along a microchannel into the vicinity of an optical detector, which is a charge-coupled device fabricated on the surface of the substrate on which the microchannel is defined. As an electrical potential difference is applied across electrodes 502 and 504, fluid 508 moves into the space between the electrodes, and fluid 506 is simultaneously displaced from the same space. Fluid 508 can then be analyzed in its new location using an optical detector (not shown for the sake of clarity). Alternatively, the detector may be positioned so as to enable analysis of displaced fluid 506 in its new location.

Figure 11:
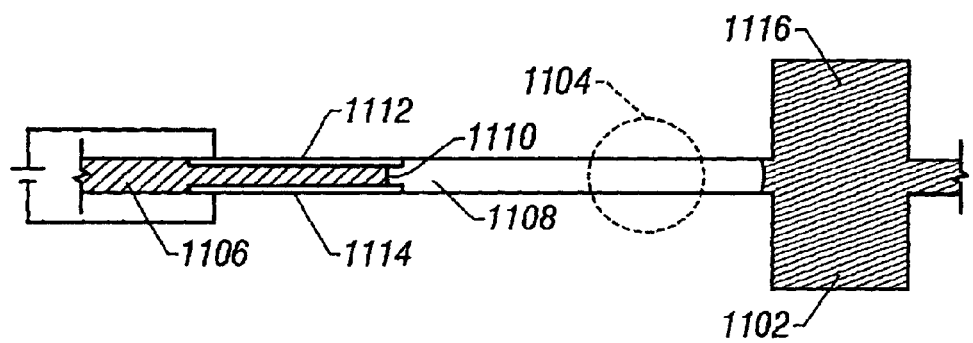
FIG. 11 illustrates a configuration in which fluid is drawn from a reservoir and to a detector.

A device as illustrated in FIG. 11 is configured to move a third fluid from, e.g., a reaction chamber 1102 to a detector 1104. In this device, fluids 1106 and 1108 provide the motive force. Interface 1110 moves due to an electrical potential difference applied across electrodes 1112 and 1114, and fluid 1108 draws at least a portion of third fluid 1116 out of the reaction chamber and to detector 1104 where, e.g., the absence, presence, and/or degree of fluorescence is detected.

Mixing and Reacting

DP and VDP may be used to move fluids through mixers fabricated in the microfluidic device. A number of different types of mixers may be used. For instance, fluid channels may intersect with one another to provide a mixing zone [e.g., see A. Desai et al., U.S. Pat. No. 5,921,678 (1999)]. Fluids from different channels are moved by a dielectric pump or variable dielectric pump on each channel, and the fluids mix at the intersection of channels. Likewise, fluids in channel networks involving multiply intersecting wide and narrow channels [configured, e.g., as disclosed in F. Regnier and B. He, U.S. Pat. No. 6,170,981 (2001)] may be pumped using DP or VDP to mix the fluids. An additional mixing scheme that may be used relies on acoustic energy to mix fluids. Fluids may be pumped back and forth using DP or VDP beneath an acoustic wave generator [e.g., as disclosed in J. C. Rife et al., U.S. Pat. No. 6,210,128 (2001)]. The acoustic waves encounter the moving fluids in a direction substantially normal to the direction of fluid flow and/or in a direction substantially parallel to the direction of flow, each of which aids in mixing across the cross-section of the microchannel. Further, an order-changing mixer [e.g., as disclosed in Y.-C. Chung, U.S. Pat. No. 6,331,073 (2001)] may be configured to use one or more pumps that utilize DP or VDP to move fluids back and forth in the microchannels.

Mixed fluids may be reacted in the channel in which they are mixed. In this case, any heaters or heat exchangers needed for the reaction are positioned in or near the mixing zone, and any detection equipment is preferably positioned as close to the reaction zone as practical to minimize how far fluids must be pumped. Mixed fluids may also be pumped to a separate reaction chamber using DP or VDP, which chamber may include heaters, heat exchangers, detection equipment, and additional channels that feed additional reactants. Fluids may then be discharged from the reaction zone to a waste chamber or out of a port of the device using DP or VDP.

Spraying

Figure 12:
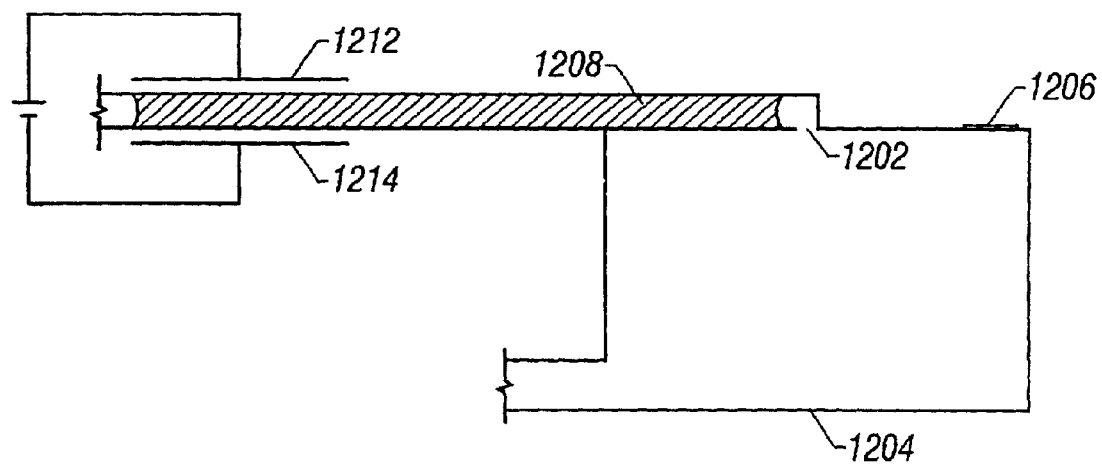
FIG. 12 depicts a configuration in which liquid is sprayed into a reaction chamber.

DP or VDP can be used to move a fluid so that it is sprayed. FIG. 12 illustrates a device in which fluid 1208 is displaced from the space between electrodes 1212 and 1214, as described above, and sprayed from orifice or nozzle 1202 into reaction chamber 1204, which is vented using a polymeric material 1206 that permits gas but not liquid to flow out the vent. The spray helps to assure a better distribution of fluid 1208 into the reaction chamber, where mixing is difficult because of the small device dimensions.

An electrosprayer may be used that provides a spray of liquid from an orifice [e.g., see J. M. Ramsey and R. S. Ramsey, U.S. Pat. No. 6,231,737 (2001)]. DP or VDP can be used in place of the electrokinetic or hydraulic force to move the liquid and create the spray. Consequently, in one configuration, the channel leading to the spray orifice has two electrodes that drive the liquid toward the orifice and provide the force needed to atomize the liquid to be sprayed.

A liquid spray can be used in ink-jet printing, in which, e.g.. droplets of ink are used to form letters on a page or to apply droplets containing nucleotides, polynucleotides, or agents that remove protecting groups from growing polynucleotide sequences to form polynucleotide microarrays. As discussed above and as illustrated in FIG. 13, a droplet can be sprayed from the end of channel 1302 toward the receiving substrate 1304. A fluid meter as discussed below provides control over the amount dispensed. Electrode 1308 is configured, using, e.g., VDP, so that low voltage is applied to one end and a high voltage is applied to the other end of the electrode compared to the voltage on electrode 1306. Fluid 1316 is drawn from reservoir 1310 through check valve 1312 by moving fluid interface 1314 away from substrate 1304, and fluid is sprayed by moving the interface toward the receiving substrate by reversing the voltages applied to the ends of electrode 1308.

Fluid Metering

Fluid can also be metered using VDP. For instance, an optical detector can detect the position of interface 1314 along channel 1302. Channel 1302 has fixed dimensions that were established when the device was fabricated, and consequently the cross-sectional area of channel 1302 is known.

It is therefore only necessary to control the distance that fluid interface 1314 moves in order to dispense a desired volume of fluid 1316. The voltages on the ends of electrode 1308 (or, alternatively, the voltage on electrode 1306) are therefore adjusted to move interface 1314 to a position that dispenses a desired amount of liquid from channel 1302, and the optical detector is used either to control the voltages directly or in conjunction with an algorithm that calculates desired voltages to be applied to electrode 1308 (or 1306) to provide feedback control on the amount of fluid dispensed.

U.S. Pat. No. 6,287,520 [by J. W. Parce and M. R. Knapp (2001)] discloses a micropipettor in which electrophoresis is used to dispense a fluid. A device can be configured to replace the electrophoresis drive unit with a pump configured to utilize DP or VDP, and as discussed above, an optical detector that monitors the position of the interface is used to monitor or control the amount dispensed.

Pressure-Based Devices

Movement of an interface can be used to produce a pressure. The force applied to an interface generates pressure if flow is restricted or prevented. If two liquids form the interface, little movement of the interface occurs. If one of the fluids has a gaseous phase, the interface moves as the gaseous phase compresses. In either instance, one of the fluids is pressurized, and the pressure can be used to perform work.

Figure 14:
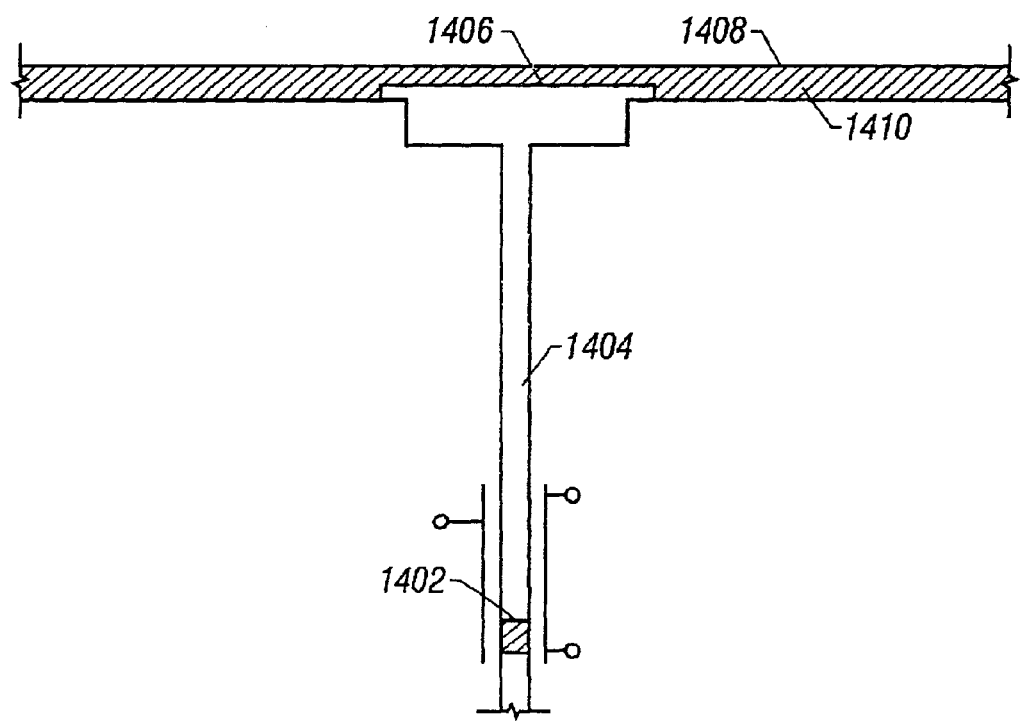
FIG. 14 illustrates a pinch valve provided by the invention.

A pinch valve that is useful in controlling flow rate is illustrated in FIG. 14. Interface 1402 is moved using DP or VDP, causing a pressure buildup in fluid 1404. This increased pressure acts to flex polymeric diaphragm 1406 into channel 1408, resulting in a restriction in the flow of liquid 1410.

Figure 15:
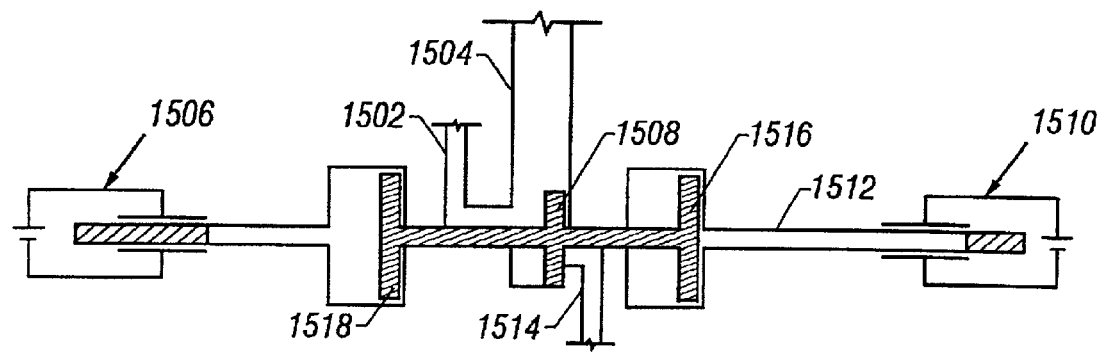
FIG. 15 illustrates a valving system in accordance with the invention.

A diverter valve that is useful in closing off flow to or from one channel and allowing flow to or from another is illustrated in FIG. 15. Fluid flows from channel 1502 to channel 1504 when dielectric pumping unit 1506 is actuated to hold diverter 1508 in the position illustrated. When electrical power is switched so that dielectric pumping unit 1506 has no potential difference across its electrodes and dielectric pumping unit 1510 has a potential difference, flapper 1508 moves because of the pressure created in channel 1512, thus closing fluid communication between channels 1502 and 1504 and providing fluid communication between channels 1514 and 1504. Pistons 1516 and 1518 provide a larger area over which pressure generated by the dielectric pumps can act.

Figure 13:
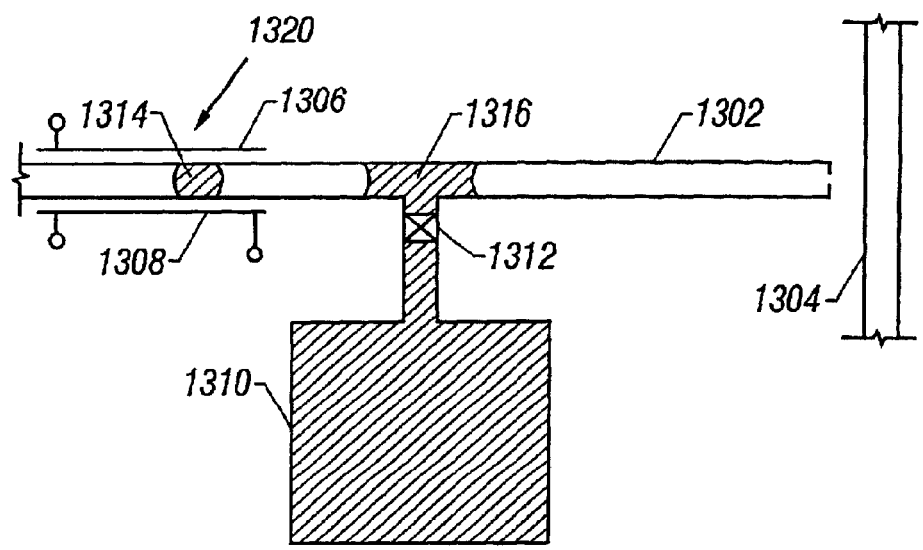
FIG. 13 illustrates a device in which fluid is drawn from a reservoir and dispensed as droplets, spray, or mist from the end of the microchannel.

Pressure can also be developed to provide a spray of liquid or vapor, for instance. The device of FIG. 13 illustrates one such device, where a given amount of fluid 1316, after being drawn from reservoir 1310, is pressurized by dielectric pumping unit 1320 for a sustained period of time. The resulting aerosol or vapor can be delivered externally to the device for clinical applications.

Other Biological Systems

Dielectric pumping may be substituted for the pumps discussed by S. C. Cherukuri et al. in U.S. Pat. No. 6,331,439 (2001), for instance.

Optical Devices

Dielectric pumping and variable dielectric pumping may be applied to optical communications devices as well, as described in our copending application filed on even date herewith A. J. Ticknor et al., "Microfluidic control for waveguide optical switches, variable attenuators, and other optical devices". A number of examples are included here that illustrate both an open and a closed loop fluid system in which the fluids are moved using DP and VDP.

Optical devices of the invention have a fluid channel and a waveguide that guides an optical signal. A waveguide generally consists of a central core surrounded by cladding material. The fluid channel is positioned near, upon, or through the waveguide, so that at least a portion of the energy or electric field of an optical signal traversing the waveguide extends into whatever fluid is in the fluid channel in the vicinity of the core and/or cladding of the waveguide.

The fluid channel may reside partially or completely above, below, or beside a waveguide. The fluid channel may be in physical contact with the core (such as in an optical attenuator or optical shutter in which mode leakage from the core is desired). The fluid channel may instead be separated from the core by a layer of cladding that is sufficiently thin to allow energy from the optical signal traversing the waveguide to extend into the fluid channel and any fluid contained in the fluid channel in the vicinity of the waveguide. The fluid channel may intersect the core, so that it forms all or part of the cross-section of a portion of the core. The fluid channel may cross the core without intersecting it, but surrounding it in whole or in part. The fluid channel may in any of these instances also extend into cladding above and/or below the core to effectively attenuate, refract, diffract, reflect, retard, filter, or block the optical signal encountering the fluid and/or optional solid in the fluid channel. The fluid channel may further be configured as replacing the core of the waveguide for some length.

Figure 16A:
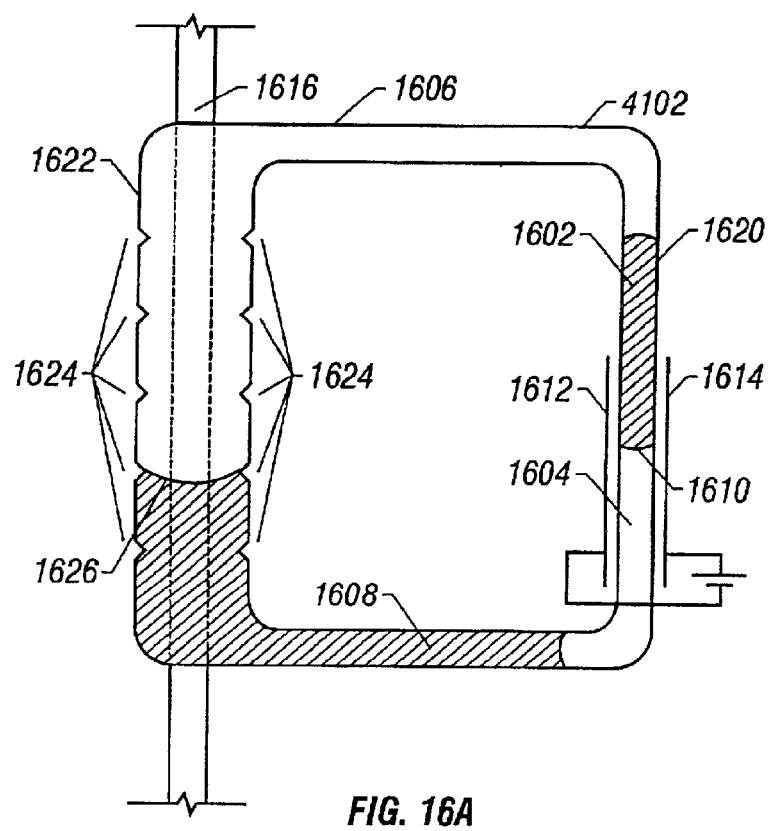
FIGS. 16a and 16b depict a device useful in optical telecommunications provided by the invention.
Figure 16B:
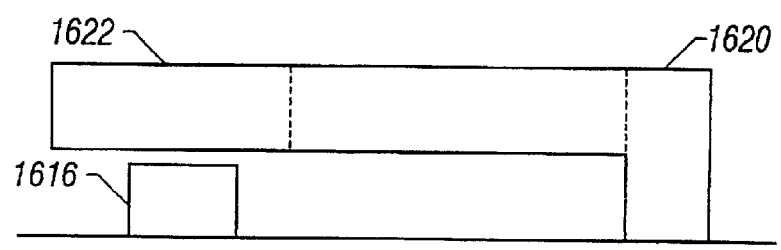
Figure 17A:
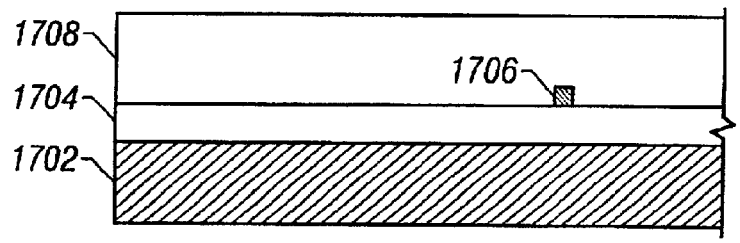
FIGS. 17–20 depict several methods of making devices of the invention.
Figure 17B:
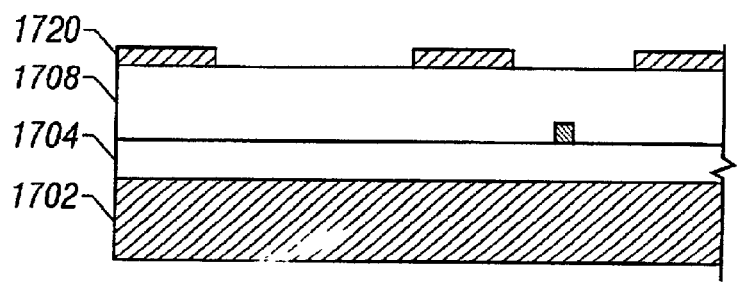
Figure 17C:
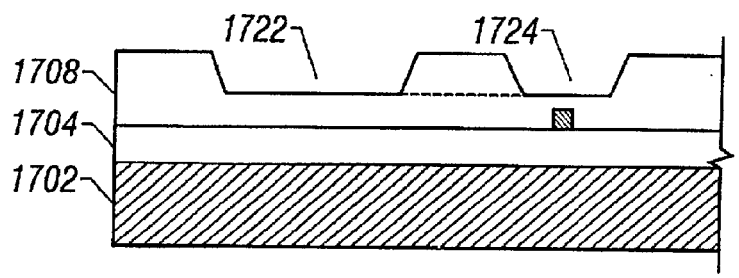
Figure 17D:
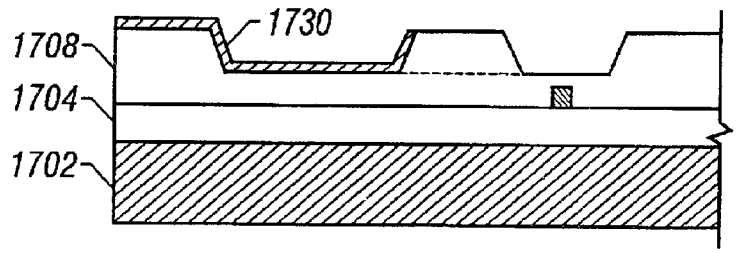
Figure 17E:
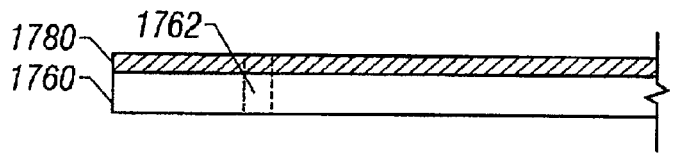
Figure 17F:
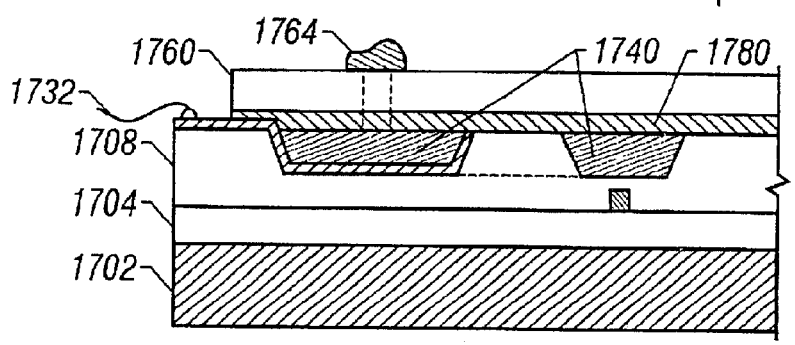

FIG. 16(a) and 16(b) illustrates one optical device that incorporates a pump based on variable dielectric pumping. In this device, there are four separate fluids, two fluids 1602 and 1604 selected for their ability to be moved using dielectric pumping, and two optical fluids 1606 and 1608 selected for their respective refractive indices. Fluid interface 1610 in channel portion 1620 is acted upon by electrodes 1612 and 1614 using appropriate voltages on the electrodes as discussed herein in order to position a desired amount of fluids 1606 and 1608 in the cladding above waveguide core 1616 in order to effect a change in the optical signal passing through core 1616. Since in a single-mode device the electric field of the optical signal occupies no more than about 20 $\mu$m of the cladding, the optical fluid is positioned within 20 $\mu$m of the core if the microchannel in which the fluid travels does not form part of the core. A fluid microchannel is preferably less than about 20$\mu$m wide if the microchannel cuts across the core to form part of it.

A channel in an optical device or in any other device of the invention may be configured so that the fluid interface moves in steps or discrete increments by incorporating spatial or surface energy inhomogeneities into the channel walls. As illustrated in FIG. 16(a), the sidewalls of channel portion 1622 may have a plurality of micron-size indentations 1624 (either out from or into the wall, and either on one side only or on both). Alternatively, a thin film (as thin as a single molecular layer) of a low-surface-energy coating agent such as a silane coupling agent, a fluorocarbon, or a fluoropolymer may be deposited onto one or more of the microchannel walls and patterned into narrow strips that run across the direction of fluid motion. Each of the indentations and the narrow strips effectively act as surface irregularities, which modify the energy landscape seen by moving fluid interface 1626. As the interface moves along the channel, it takes additional pressure to move the interface past either the indentations 1624 or the narrow strips. Keeping the driving pressure below the threshold needed for overcoming the irregularities ensures that the interface remains pinned at one of the irregularities, while applying a short burst of extra pressure, with DP or VDP, moves the interface past the irregularity.

A microchannel that runs in proximity to a waveguide core for some length is typically separated from the core by a thickness of cladding material ranging from 0 to 20 μm, with preferred embodiments between 0 and 5 μm. The length of the overlapping region can range from 100 μm to 10 mm, and typically would be between 1 mm and 5 mm; slug lengths in this case are comparable to the length of the overlap region. For the case of a microchannel that intersects the waveguide core, the channel width at intersection is up to about 20 μm, the core width at intersection is also up to about 20 μm, and slug lengths can range from about 50 μm to as much as 1 mm, with typical lengths between 100 μm and 500 μm. All these dimensions are appropriate for optical wavelengths in the neighborhood of 1.5 μm; where the devices are designed to work in other wavelength in the range from 0.3 μm to 1.8 μm, the dimension would be scaled appropriately (e.g., for a wavelength of 0.6 μm, the intersecting channel width would be up to about 8 μm). The ranges of dimensions, particularly for the depth of the microchannels, vary depending on the fabrication approach and on the device structure. For example, a microchannel may be constructed only in the optical chip and devised to act by proximity to (e.g, on top of) the waveguide. It would then be between about 10 μm and 20 μm deep. On the other hand, it may be constructed in both the optical chip and in the cover chip, and devised to act by intersecting the waveguide. It would then be between about 20 μm and 100 μm deep (15 μm to 30 μm of depth in the optical chip, the rest in the cover chip).

The waveguide above is typically part of an optical device such as an optical switch, shutter, attenuator, phase shifter, wavelength-selective filter, or other device based on, e.g., a delta-beta (evanescent) coupler, Mach-Zehnder interferometer, multimode interferometer, a grid of reflection elements, or other optical devices used in telecommunications systems and/or data transmission systems.

Method of Making Devices of the Invention

Generally, devices of the invention can be fabricated using available semiconductor, glass, and/or plastic processing techniques. The fabrication process chosen to construct a specific device of the invention depends in part on the nature of the device, the properties of the fluids, the configuration of the electrodes in relationship to both the channels and the other components of the device such as reservoirs, reaction chambers, optical detectors, and waveguides. In what follows, some exemplary embodiments of fabrication processes are outlined, while others are readily apparent to those skilled in the art from the disclosure herein. While a single channel, core, electrode, and injection port are illustrated in the accompanying figures for the sake of clarity, a device of the invention may include multiple such cores, electrodes, and/or injection ports, as required by the function and design of the device. In addition, while the methods below describe fabricating fluid flow channels, waveguides, and optical devices using, e.g., a silicon substrate and glass cover, other materials may readily be substituted by those skilled in the art. For example, either or both of the substrate and the cover may consist of silicon, silica, Pyrex or other glass, polymer (such as, e.g., polycarbonate, polyimide, benzocyclobutene, or polyacrylate), or a combination thereof.

Preferably, the microfluidic devices described herein are configured to have microchannels in which at least a portion of one of the fluids resides. Microchannels, as discussed previously, are channels having a size such that fluid motion is dominated by interfacial forces and not by gravity. The incorporation of microchannels provides small devices and other planar lightwave circuits as are found in optical telecommunications systems today, as well as small analytical devices that minimize sample requirements when the device is configured to analyze biological, chemical, or other materials.

FIG. 17 illustrates a cross-section of an optical device as it is being fabricated. In this example, a fluid channel is patterned over a waveguide, and one electrode on the substrate makes contact with the fluid in a reservoir. As illustrated in FIG. 17(a), a waveguide is patterned on a standard silicon wafer 1702 (as used in semiconductor manufacturing) by thermally growing bottom cladding $SiO_2$ layer 1704 and forming doped $SiO_2$ core 1706 within doped $SiO_2$ top cladding 1708 using, e.g., low-pressure chemical vapor deposition (LPCVD) or plasma-enhanced chemical vapor deposition (PECVD) and reactive ion etching (RIE). A 2-μm thick layer of amorphous silicon (α-Si) 1720 is deposited onto the wafer (e.g., using PECVD) and patterned (e.g., using a photoresist mask and RIE), as illustrated in FIG. 17(b). This provides a hard mask used to etch top cladding 1708 to a depth of approximately 15 μm from the surface of the cladding, resulting in the (communicating) structures 1722 and 1724 illustrated in FIG. 17(c). The distance between core 1706 and the outer surface of the residual oxide layer 1708 in 1724 is sufficiently small that a portion of the optical signal that the device is designed to carry extends into the open space 1724 above the core. This open space will eventually be filled with a fluid, as described below. A thin conductive layer (e.g., 0.5 μm of tungsten or indium tin oxide, ITO) or a thin resistive layer (e.g., 0.2 μm of tungsten, titanium, or tantalum, optionally anodized to vary its resistance) is deposited (e.g., by sputtering) and etched to form electrode 1730 in reservoir 1722 not overlying the core, as illustrated in FIG. 17(d). This conductive or resistive layer is optionally passivated with a thin layer of oxide (e.g., $SiO_2$). The structure in FIG. 17(d) is then typically diced into individual units, or chips. To complete the fluid channel, a Pyrex or silica cover glass 1760 approximately 0.5–1 mm thick is first patterned with injection port 1762 (formed by, e.g., drilling, etching, or ablation), as illustrated in FIG. 17(e). A bonding layer 1780 (consisting, e.g., of an epoxy, polystyrene, polyimide, or other polymer, a low-temperature melting glass, frit, or sealing glass, a spin-on silicate glass, or other similarly suitable material) is then deposited on the cover glass, e.g., by sputtering, PECVD, or spin coating. As illustrated in FIG. 17(f), this cover glass is then assembled with and bonded to cladding 1708 (e.g., by application of heat, light, and/or pressure over some period of time), and electrical connection 1732 is made to the exposed portion of electrode 1730 by wire bonding. Liquid 1740 is finally inserted into the fluid channels 1722 and 1724 through injection port 1762, after which the injection port is sealed with epoxy, polymer, or other suitable material 1764.

The method described above allows a continuous or discontinuous microchannel to be formed on the same substrate in which the waveguide is formed. A second substrate may then be glued or fused to the microchannel-containing substrate to seal the microchannel without having to accurately align features on the second substrate to the first substrate. The second substrate may thus have a flat face that adheres to a flat face on the microchannel-containing substrate, which provides strong bonding and good microchannel sealing.

Figure 18A:
Figure 18B:
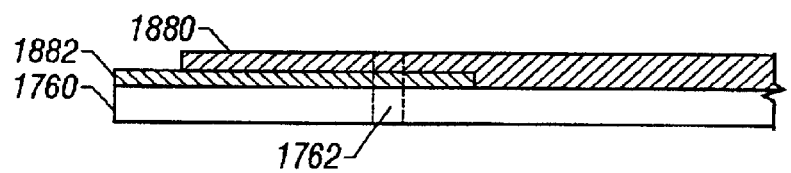
Figure 18C:
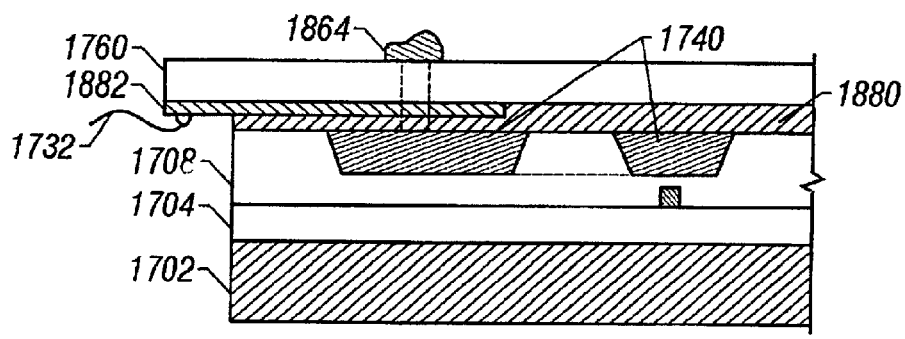

One alternate method of forming a device of the invention is shown in FIG. 18. In this example, a fluid channel is patterned over a waveguide as in FIG. 17(a–c), and one electrode on the cover glass makes indirect contact with the fluid in a reservoir. As illustrated in FIG. 18(a), a thin conductive layer (e.g., 0.5 μm of tungsten or indium tin oxide, ITO) or a thin resistive layer (e.g., 0.2 μm of tungsten, titanium, or tantalum, optionally anodized to vary its resistance) is deposited (e.g., by sputtering) on a Pyrex or silica cover glass 1760 and etched to form electrode 1870. This conductive or resistive layer is optionally passivated with a thin layer of oxide (e.g., $SiO_2$). FIG. 18(*b*) depicts the injection port 1762 formed in the cover glass, e.g., by drilling; where such port coincides with a metal region, the port extends through the metal layer. A thin bonding layer 1880 is deposited, e.g., by spin coating, and bond pads 1882 are cleared to allow for wire bonding. FIG. 18(*c*) illustrates the resulting cover glass structure being bonded to the waveguide and channel structure shown in FIG. 17(*c*). Wire bonding 1732 to the electrode, fluid injection, and injection port sealing follow as described above. This configuration of the conductive or resistive electrode in relationship to the fluid enables using the silicon substrate as a second electrode (ground plane) for devices where a parallel-plate electrode structure is appropriate.

Figure 19A:
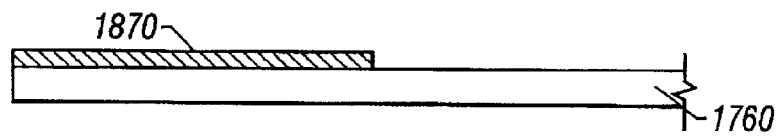
Figure 19B:
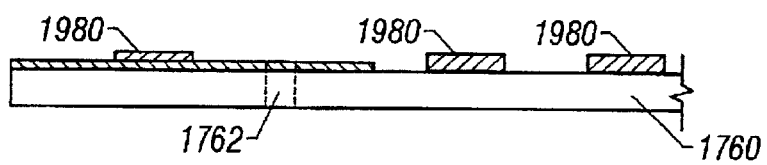
Figure 19C:
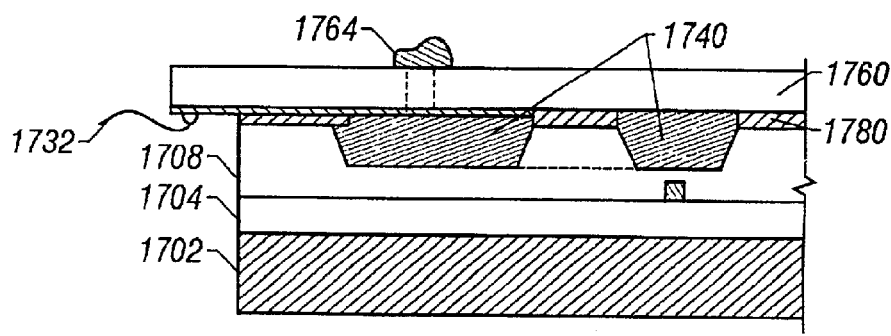
Figure 20A:
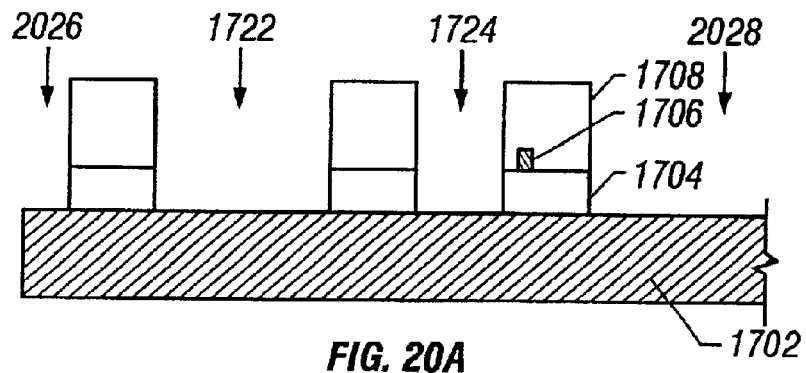
Figure 20B:
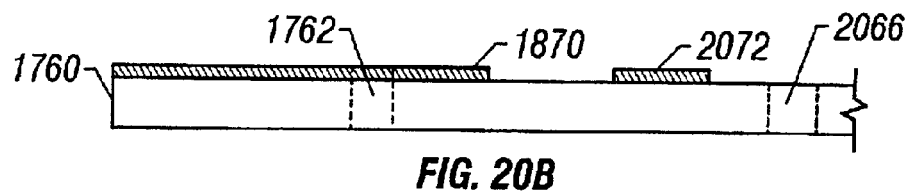
Figure 20C:
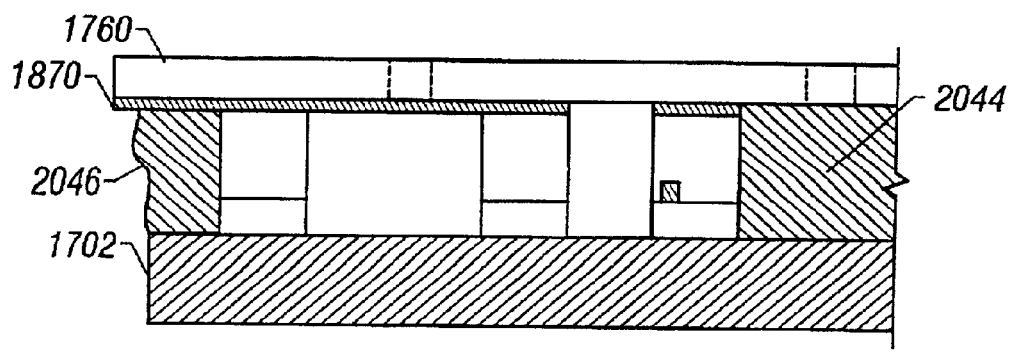
Figure 20D:
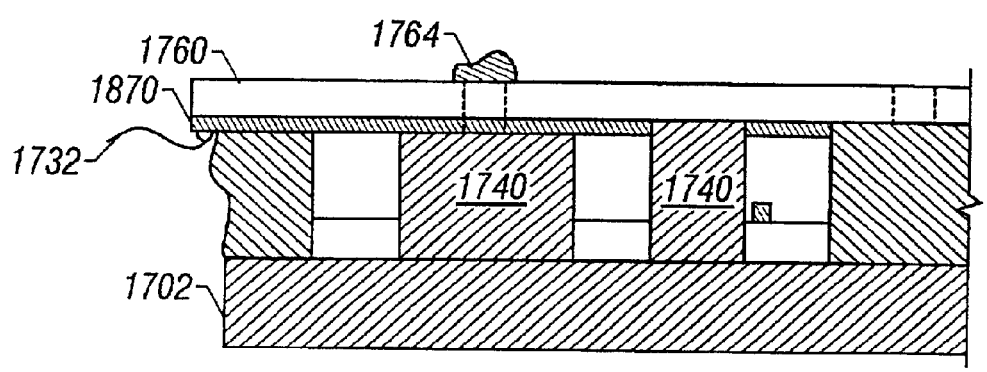

An alternate method of bonding the cover glass to the waveguide and channel structure is illustrated in FIG. 19. In this example, a fluid channel is patterned over a waveguide as in FIG. 17(*a–c*), and one electrode on the cover glass makes direct contact with the fluid in a reservoir. As depicted in FIG. 19(*a*), a cover glass 1760 is patterned with electrode 1870 as described above. FIG. 19(*b*) shows a bonding layer deposited and patterned (e.g., by deposition and etching or by screen printing), resulting in bonding regions 1980, which are configured to match the unetched portions of the oxide layer 1708. The cover glass is then aligned and bonded to the waveguide and channel structure as illustrated in FIG. 19(*c*). Wire bonding 1732 to the electrode, fluid injection, and sealing of the injection port follow as described above. Yet another option (not shown) is to form the patterned bonding layer on the waveguide and channel side instead of on the cover glass. Alignment, bonding, and subsequent electrical connections, fluid injection, and injection port sealing proceed in an analogous manner to what described above.

Yet another method of forming a device of the invention is illustrated in FIG. 20. In this example, a deep fluid channel is patterned next to a waveguide, and one electrode on the cover glass makes contact with the fluid in a reservoir. FIG. 20(*a*) illustrates a waveguide and channel structure formed by deep etching (e.g., with RIE) channels 1722, 1724, 2026, and 2028 through top cladding 1708 and bottom cladding 1704. The channels may reach down to the silicon substrate 1702, or there may be a thin residual oxide layer above the silicon surface. The gap between core 1706 and channel 1724 is sufficiently small that a portion of the optical signal that the device is designed to carry extends into channel 1724. This channel, as well as channel 1722 with which it communicates, will eventually be filled with fluids for operation of the device according to the invention. Channels 2026 and 2028, on the other hand, will eventually be filled with adhesive material and are not communicating with channels 1722 or 1724. As illustrated in FIG. 20(*b*), a cover glass 1760 is deposited with a conductive or resistive layer, which is then patterned to yield electrode 1870 and element 2072. This latter element, which is not electrically connected to the electrode, is left unetched to provide a very nearly planar surface for subsequent bonding to the waveguide and channel structure. Injection ports 1762 and 2066 are patterned in the cover glass, e.g., by drilling or etching. The cover glass is then aligned to the waveguide and channel structure, as illustrated in FIG. 20(*c*). A liquid bonding material 2044 (e.g., epoxy, polymer, silicate glass, or other suitable material) is injected through port 2066, and the same material 2046 is applied to exposed areas on the outside of the assembled structure. The bonding material is processed as needed to obtain a stable bond (e.g., by application of heat and/or light for a period of time). Wire bonding, fluid injection, and sealing of the injection port proceed as described above.

The devices described in the preceding figures consist of fluid channels patterned in the same substrate that holds the waveguide structures. A device of the invention may instead consist of channels partly patterned in the cladding layer or layers of the waveguide structure, and partly in the cover glass. Similar masking and etching steps used in the process to pattern a channel in the oxide layers of the waveguide may be employed to pattern a channel in the Pyrex or silica cover glass. The resulting devices may consist of channels entirely in the waveguide structure, entirely in the cover glass, or a combination of the two. Patterning channels at least partly in the cover glass may present several advantages, such as larger dimensions for reduced viscous drag, and greater flexibility in designing the channel structures.

Another method of forming a device of the invention consists of patterning the channels in a bare silicon substrate or in a silicon substrate with a thermally grown oxide layer, while the optical waveguides are patterned on a separate substrate in the standard way as shown in FIG. 17(*a*). To provide proper alignment of the cores to the fluid-containing channels, location tabs (or slots) may be etched into the surface of the core-containing substrate, which tabs (or slots) fit into slots (or tabs, respectively) on the channel-containing substrate.

In the bonding methods described above, the bonding layer is assumed to have a certain mechanical compliance, either at standard temperature and pressure, or at elevated temperature and/or pressure. This compliance enables the bond to form even when the two surfaces to be bonded are not perfectly flat. Departures from flatness may arise because of nonuniformities in the manufacturing process, e.g., in the thickness of deposited oxide layer 1708; because of curvature, either inherent or induced, of either the substrate or the cover glass; because of particles of dust or dirt inadvertently trapped between the two surfaces during assembly; or because of surface topography, e.g., such as the conductive or resistive layer 1730 in FIG. 17(*f*). Formation of the bond, e.g., through application of heat and/or pressure over a period of time, can be designed to occur with a degree of plastic deformation, or flow, of the bonding material sufficient to ensure full contact of the two surfaces over the entire bonding area.

Alternatively, the two surfaces may be configured to be very nearly flat prior to the bonding step. This may be achieved through careful control of the processing conditions and/or through subsequent planarization of either one or both surfaces (e.g., by lapping, polishing, chemical mechanical polishing, or a combination of all three). In this case, compliance of the bonding material is not required, and additional bonding processes may be employed. For example, if the two surfaces to be bonded have silicon oxide as the topmost layer, direct bonding (e.g., applying pressure in vacuum or in a clean atmosphere) may be used. Another process, suitable where the materials in the substrate and cover glass are conductive, is anodic bonding, where a large electrical current is sent through the bonding area after making contact between the two surfaces.

A device of the invention may also be hermetically sealed with glass, metal, or other material to prevent evaporation of liquid or diffusion of fluids from or into the device. Polymers used in making a device (such as, e.g., epoxy) typically allow fluid diffusion. Consequently, a hermetic seal is desirable to extend the useful life of a device of the invention. A hermetic seal may include the use of a suitably hermetic material in the bonding process (e.g., sealing glass or spin-on silicate glass), the use of a hermetic bond (e.g., direct bonding or anodic bonding), and/or the use of a hermetic material (e.g., gold or other metal, or a glass overlayer) in sealing the fluid injection ports.

The devices described above include injection ports patterned in the cover glass, typically drilled, etched, or ablated vertically through the cover glass thickness. An alternative consists of patterning a horizontal channel, either in the waveguide structure or in the cover glass, that extends all the way to the edge of the device. This channel may then be used as an injection port to deliver a fluid or fluids to the desired positions in the main channel structures inside the device, and may then be sealed as described above for vertical injection ports.

A gas bubble may be introduced into the channel as one of the fluids. Once a bubble is injected through one of the fluid injection ports, additional fluid or fluids can be injected through the same port to move the bubble into proper position in the channel. Other components such as solids may be introduced through the injection port or may be placed in the channel before glass layer 1760 is placed on cladding 1708. Thus, a polymeric or crystalline diffraction grating may be placed in the channel prior to bonding the glass layer onto the cladding, and fluid or fluids may then be introduced into the channel through the injection ports to contact the grating and fill the remainder of the channel.

In some devices of the invention, several fluids are required for proper function. In this and other cases, it may be advantageous to use two ports, one for injection and one for venting. The desired fluids are then injected through an injection port in the order in which they are to be found in the channel. The fluids are positioned in the desired places in the channel (so that fluids to be moved by the motive force are in the region of the motive force, and fluids to be moved into or out of the optical zone are in the desired positions), and all the air in the channel vacates the channel through the second (venting) port if air is not one of the fluids to be incorporated into the device. Once the channel is filled with the desired fluids, the injection and venting ports are sealed with epoxy, and an optional protective glass overlayer is placed over the assembled device to improve the quality of the seal.

The processes of fluid injection and sealing of the injection port may instead be reversed. The injection port may be sealed with, e.g., RTV silicone, epoxy, or other suitable material. A needle inserted through the sealing material allows a microsyringe to deliver carefully controlled amounts of fluid or fluids to the channels in the device; an optional second needle, inserted in another sealed port, may function as a venting port. After the fluid or fluids are injected, the needles may optionally be removed, the sealing material closing up behind to form a seal.

Although only a few exemplary embodiments of the invention have been described in detail above, those skilled in the art will readily appreciate that a number of modifications are possible in the exemplary embodiments without materially departing from the novel teachings and advantages of the invention. Accordingly, the following claims are to be afforded an interpretation consistent with the specific embodiments as well as the broad principles of the invention discussed herein.

What is claimed is:

1. A pumping device comprising a substrate having walls which define a microchannel, a first electrode, and a second electrode, wherein said first and second electrodes are positioned to form a first capacitor having an electric field that traverses the microchannel, wherein the microchannel contains a first fluid and a second fluid between the electrodes, said first and second fluids having a first interface therebetween and said first and second fluids having different constants such that the first interface between said fluids moves in the presence of the electric field, and wherein the first electrode is configured to have a first potential applied to a first end of the electrode and a second potential applied to a second end of the electrode.

2. A pumping device according to claim 1 wherein the microchannel is a continuous channel.

3. A pumping device according to claim 2 wherein said microchannel has a tapered portion having a fluid interface therein.

4. A pumping device according to claim 1 wherein the microchannel is a discontinuous channel having a first end and a second end.

5. A pumping device according to claim 1 wherein the microchannel has at least one reservoir in fluid communication with the microchannel.

6. A pumping device according to claim 5 wherein said reservoir contains said first fluid, wherein said first fluid is a liquid, wherein said reservoir is sealed, and wherein said reservoir further contains a gas.

7. A pumping device according to claim 1 wherein the substrate defines one or more flow-restricting indentations in the microchannel having a size sufficient to restrain free flow of a liquid through the microchannel.

8. A pumping device according to claim 1 wherein a portion of the walls forming the microchannel has a coating applied thereon of sufficient hydrophobicity that the coating restrains flow of a polar liquid through the microchannel.

9. A pumping device according to claim 1 wherein the first fluid and the second fluid are liquids.

10. A pumping device according to claim 1 wherein the microchannel contains a third fluid in a portion of the microchannel that is not immediately between said first and second electrodes.

11. A pumping device according to claim 10 wherein the third fluid contains a biological molecule.

12. A pumping device according to claim 10 wherein the third fluid comprises a drug.

13. A pumping device according to claim 10 wherein the third fluid has a refractive index suitable for a core or cladding of an optical telecommunications device.

14. A pumping device according to claim 1 and further comprising a third electrode and a fourth electrode positioned to form a second capacitor having an electric field that traverses the microchannel.

15. A pumping device according to claim 14, wherein the third electrode is configured to have a first potential applied to a first end of said electrode and a second potential applied to a second end of said electrode.

16. A pumping device according to claim 1 wherein a first portion of the microchannel has a cross-sectional area that is greater than a cross-sectional area of a second portion of the microchannel.

17. A pumping device according to claim 16 wherein said microchannel has a third portion that tapers between said first portion and said second portion.

18. A pumping device according to claim 17 wherein said microchannel has a second fluid interface positioned in said third portion.

19. A pumping device comprising a substrate having walls which define a microchannel, a first electrode, and a second electrode, wherein said first and second electrodes are positioned to form a first capacitor having an electric field that traverses the microchannel, wherein the microchannel contains a first fluid and a second fluid between the electrodes, said first and second fluids having a first interface therebetween and said first and second fluids having a different dielectric constants such that the first interface between said fluids moves in the presence of the electric field, wherein the first electrode is configured to have a first potential applied to a first end of the electrode and a second potential applied to a second end of the electrode, and wherein the second electrode is configured to have a third potential applied to said electrode, wherein the third potential is greater than said first potential, and wherein the third potential is less than said second potential.

20. A method of moving a first fluid in a microchannel, said method comprising placing an interface formed by said first fluid and a second fluid in an electric field generated by a capacitor having a first plate at first potential and a second plate at a second potential by placing a first end of the second plate at the second potential and placing a second end of the second plate at a third potential, said second potential being greater than said first potential and said third potential being less than said first potential, wherein said first fluid and said second fluid have sufficiently dissimilar dielectric constants that said interface moves in the presence of said electric field.

21. A method according to claim 20 wherein the method further comprises changing at least one of said first, second, and third potentials to move said interface a second time.

22. A method according to claim 20 wherein said method further comprises moving a third fluid that is in communication with said first fluid.

23. A method of using dielectric pumping, said method comprising moving a fluid volume within a microchannel in an optical telecommunications device using a method according to claim 20.

24. A method of using dielectric pumping, said method comprising moving a fluid volume within a microchannel to react or analyze a biological or chemical sample using a method according to claim 20.

* * * * *